(12) United States Patent
Erickson et al.

(10) Patent No.: US 11,712,751 B2
(45) Date of Patent: Aug. 1, 2023

(54) LASER CUTTING OF ELECTRODES IN ELECTROCHEMICAL DEVICES

(71) Applicant: Pacesetter, Inc., Sunnyvale, CA (US)

(72) Inventors: Kurt J. Erickson, Anderson, SC (US);
Jeffrey Jon Allison, Mayer, MN (US);
John Moore, Easley, SC (US); Thomas F. Strange, Easley, SC (US); David R. Bowen, Taylors, SC (US)

(73) Assignee: Pacesetter. Inc., Sunnyvale, CA (US)

( * ) Notice: Subject to any disclaimer, the term of this patent is extended or adjusted under 35 U.S.C. 154(b) by 1558 days.

(21) Appl. No.: 15/619,343

(22) Filed: Jun. 9, 2017

(65) Prior Publication Data

US 2018/0354069 A1    Dec. 13, 2018

(51) Int. Cl.
| | |
|---|---|
| *B23K 26/06* | (2014.01) |
| *B23K 26/082* | (2014.01) |
| *B23K 26/38* | (2014.01) |
| *B23K 26/40* | (2014.01) |
| *H01G 9/045* | (2006.01) |
| *H01G 9/00* | (2006.01) |
| *H01G 9/04* | (2006.01) |
| *B23K 101/36* | (2006.01) |
| *B23K 103/10* | (2006.01) |

(52) U.S. Cl.
CPC ........ *B23K 26/0626* (2013.01); *B23K 26/082* (2015.10); *B23K 26/38* (2013.01); *B23K 26/40* (2013.01); *H01G 9/0029* (2013.01); *H01G 9/04* (2013.01); *H01G 9/045* (2013.01); *B23K 2101/36* (2018.08); *B23K 2103/10* (2018.08)

(58) Field of Classification Search
CPC ........ B23K 26/06; B23K 26/08; B23K 26/38; B23K 26/40; H01G 9/14; H01G 9/00; H01G 9/04

USPC .......................... 219/121.6–121.86; 29/25.03
See application file for complete search history.

(56) References Cited

U.S. PATENT DOCUMENTS

| | | | |
|---|---|---|---|
| 3,779,877 A | 12/1973 | Alwitt | |
| 4,525,249 A | 6/1985 | Arora | |
| 6,099,600 A * | 8/2000 | Yan | .......................... H01G 9/00 29/25.03 |
| 6,802,954 B1 | 10/2004 | Hemphill et al. | |
| 6,858,126 B1 | 2/2005 | Hemphill et al. | |
| 8,535,527 B2 | 9/2013 | Irgum | |

(Continued)

FOREIGN PATENT DOCUMENTS

JP        200-149911 A        5/2000

OTHER PUBLICATIONS

Lutely, A. et al. "Quality and Productivity Considerations for Laser Cutting of LiFePO4 and LiNiMnCoO2 Battery Electrodes", Procedia CIRP, Elsevier, vol. 42, 433-438 pages (2016).

*Primary Examiner* — Tu B Hoang
*Assistant Examiner* — Thomas J Ward

(57) ABSTRACT

Fabricating a capacitor includes performing an oxide formation operation on a sheet of material. The oxide formation operation forms an anode metal oxide on an anode metal. A thermal compression is performed on the sheet of material after the oxide formation operation is performed. The thermal compression applies thermal energy to the sheet of material while applying pressure to the sheet of material. After the thermal compression, the capacitor is assembled such that at least one electrode in the capacitor includes at least a portion of the sheet of material.

19 Claims, 12 Drawing Sheets

(56) References Cited

U.S. PATENT DOCUMENTS

| | | | |
|---|---|---|---|
| 9,878,401 B1* | 1/2018 | Veeramani | C25D 5/48 |
| 2003/0057194 A1* | 3/2003 | Fidalgo | B23K 26/04 |
| | | | 219/121.72 |
| 2003/0155328 A1* | 8/2003 | Huth | B23K 26/125 |
| | | | 219/121.84 |
| 2007/0199927 A1* | 8/2007 | Gu | B23K 26/0626 |
| | | | 219/121.69 |
| 2007/0246447 A1* | 10/2007 | Lai | H01L 21/02356 |
| | | | 257/E21.664 |
| 2014/0326295 A1* | 11/2014 | Moslehi | H02S 20/25 |
| | | | 438/59 |
| 2018/0229332 A1* | 8/2018 | Tsai | B23K 26/22 |
| 2019/0088954 A1* | 3/2019 | Weigman | H01M 4/04 |

* cited by examiner

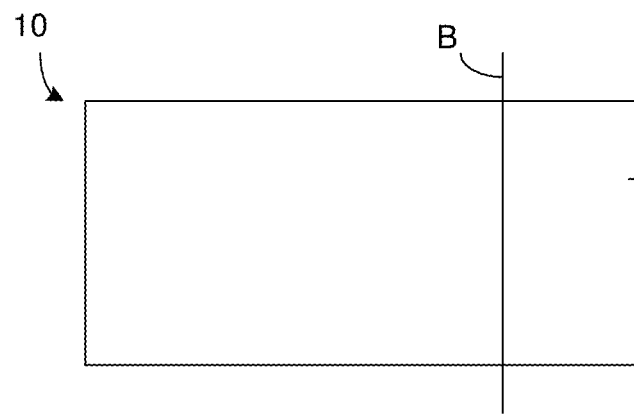
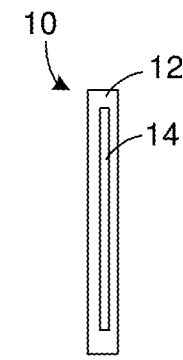
Figure 1A　　　　　Figure 1B
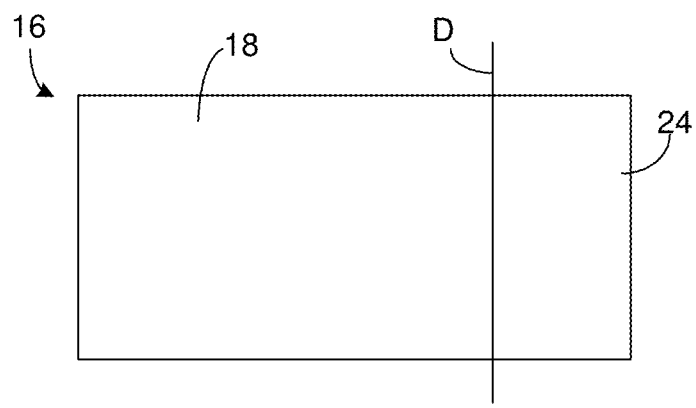
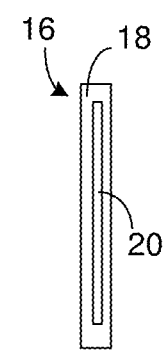
Figure 1C　　　　　Figure 1D
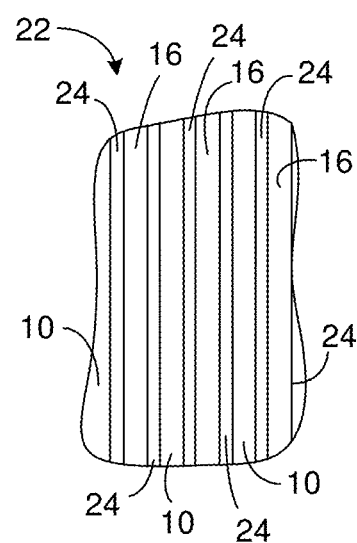
Figure 1E

A

B

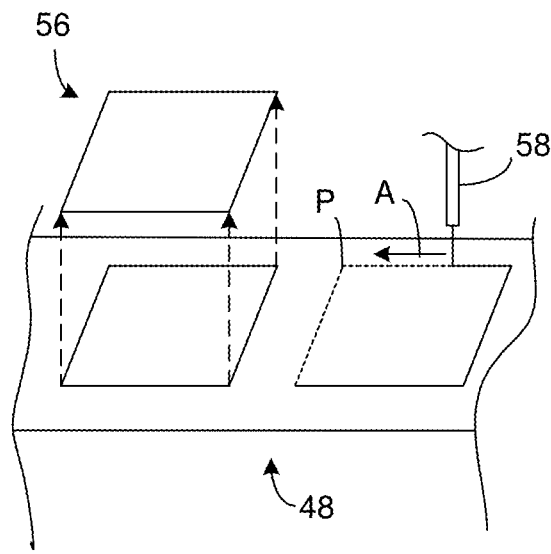
Figure 2G
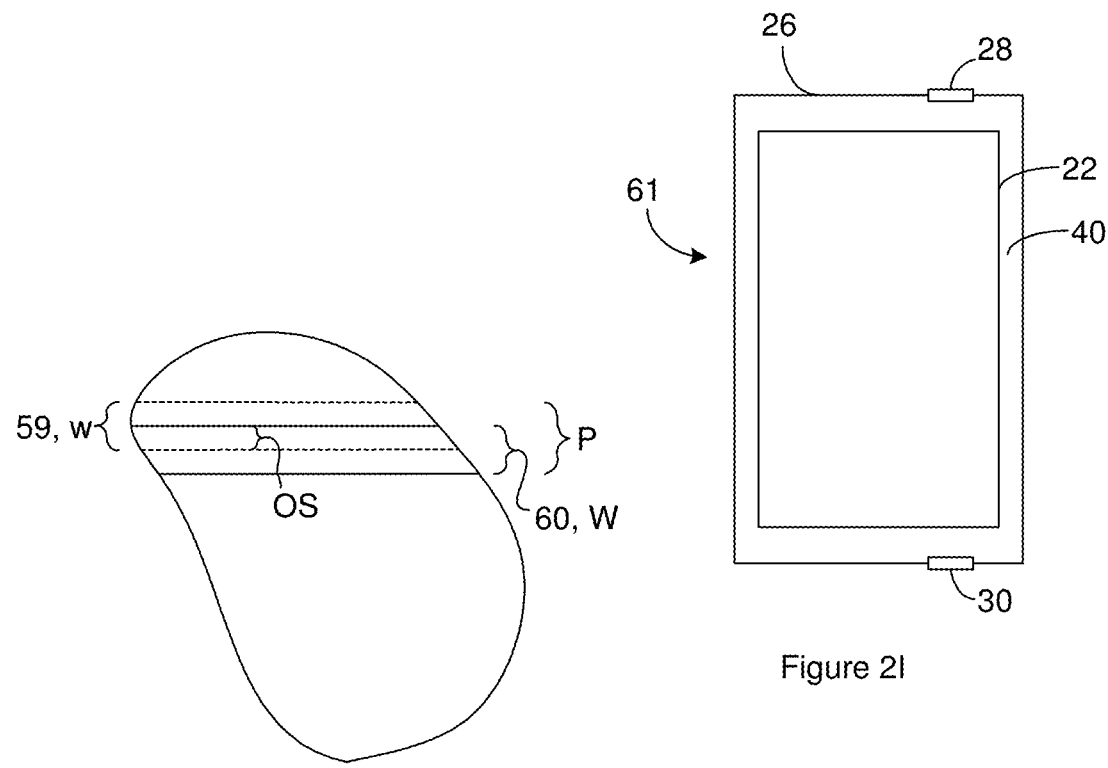
Figure 2H
Figure 2I

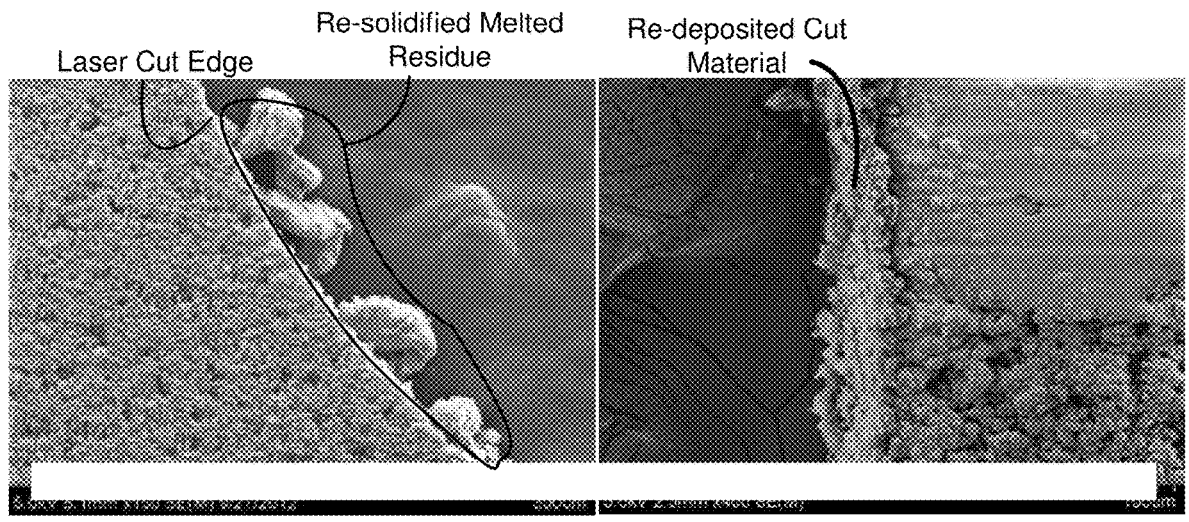
Figure 3A    Figure 3B
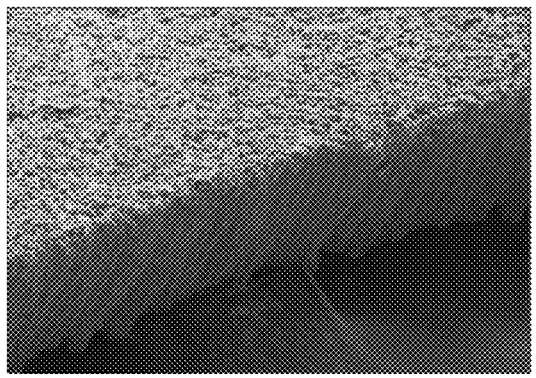 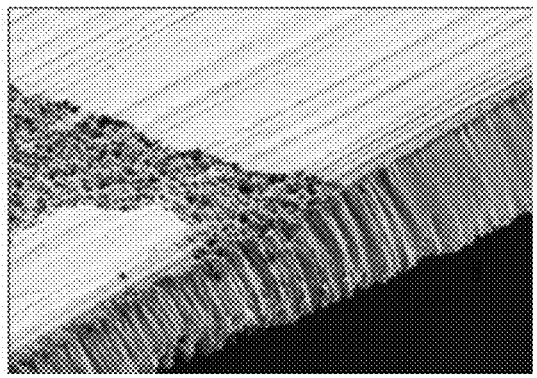
Figure 3C    Figure 3D

LASER CUTTING OF ELECTRODES IN ELECTROCHEMICAL DEVICES

FIELD

The invention relates to electrochemical devices. In particular, the invention relates to electrodes in capacitors.

BACKGROUND

In the current process for manufacturing aluminum electrolytic capacitors, the anodes are typically punched or stamped from a sheet of material using a mechanical die. After the anodes are punched or stamped, the anodes are assembled into stacks with cathodes. Separators are positioned between cathodes and anodes that are adjacent to one another in the stack. The punching process can cause the edges of the anode to have burrs and other particles that can penetrate the separator and cause a short in the capacitor or otherwise compromise the quality and life of the capacitor.

Additionally, the physical stress of the punching or stamping process can cause cracking of the anode. Tabs are often welded to the anodes to provide electrical communication between the anodes and a terminal of the capacitor. The cracks formed by stamping or punching can propagate when welding the tabs to the anodes. Propagation of the cracks can cause the tabs to detach from the anode.

Further, the dies are made of steel and can contaminate the anode with iron particles. In addition to the iron penetrating the separator, the iron is also a source of corrosion that can lead to leakage and premature capacitor failure.

For the above reasons, there is a need for improved capacitor anodes.

SUMMARY

Fabricating a capacitor includes performing an oxide formation operation on a sheet of material. The oxide formation operation forms an anode metal oxide on an anode metal. A thermal compression is performed on the sheet of material after the oxide formation operation is performed. The thermal compression applies thermal energy to the sheet of material while applying pressure to the sheet of material. After the thermal compression, the capacitor is assembled such that at least one electrode in the capacitor includes at least a portion of the sheet of material.

Fabricating an electrode for an electrochemical device can include laser cutting the anode from a sheet of material. The laser cutting can be performed with any one, any two, any three, any four, any five, any six, or any seven parameters selected from the group consisting of a laser pulse duration greater than 0 s and less than a microsecond, a laser pulse frequency less than 2000 kHz, a pulsed laser spot overlap greater than 70%, a power density greater than $2\times10^5$ W/cm$^2$, a scan rate greater than 100 mm/sec, a pass interval greater than 0.1 s, and a pass number greater that 10. The scan rate represents the rate at which the laser beam is scanned across the sheet of material during laser cutting. The pass number is the number of times that the laser beam is sequentially scanned along a pathway on the sheet of material in order to completely cut the anode from the sheet of material. The pass interval is the period of time that passes between each point along the pathway being exposed to the laser beam. The electrochemical device can be a battery or a capacitor. In some instances, the electrode is the anode of a capacitor such as an electrolytic capacitor. An example of an electrolytic capacitor is an aluminum electrolytic capacitor.

Fabricating a capacitor can include obtaining a sheet of material having a first phase of an anode metal oxide on an anode metal. The anode metal oxide is an oxide of the anode metal. A portion of the first phase of the anode metal is converted to a second phase of the anode metal oxide. At least a portion of the second phase of the anode metal oxide is removed from the sheet of material. In some instances, the first phase of the anode metal oxide is a dielectric while the second phase of the anode metal oxide is a conductor or a semiconductor.

The first phase of the anode metal oxide can be converted to the second phase of the anode metal oxide as a result of the process used to extract a capacitor anode from the sheet of material. For instance, a laser can be used to cut the anode from the sheet of material and the laser cutting can cause the conversion from the first phase to the second phase. In these instances, removing the portion of the second phase of the anode metal oxide from the sheet of material can include removing the portion of the second phase from the anode.

The anode can be placed in a capacitor before removing the portion of the second phase of the anode metal oxide from the sheet of material.

In some instances, removing the portion of the second phase of the anode metal oxide from the sheet of material is included in a cycle. The cycle can also include an oxide restoration phase that forms the first phase of the anode metal oxide on the anode or the sheet of material. In the cycle, the oxide restoration phase is performed after removing the portion of the second phase of the anode metal oxide from the sheet of material. In some instances, the cycle is performed at least twice.

BRIEF DESCRIPTION OF THE FIGURES

FIG. 1A through FIG. 1G illustrate the construction of a capacitor. FIG. 1A is a sideview of an anode that is suitable for use in the capacitor.

FIG. 1B is a cross-section of the anode shown in FIG. 1A taken along the line labeled B in FIG. 1A.

FIG. 1C is a sideview of a cathode that is suitable for use in the capacitor.

FIG. 1D is a cross-section of the cathode shown in FIG. 1C taken along the line labeled D in FIG. 1C.

FIG. 1E is a cross section of an electrode assembly where anodes are alternated with cathodes. The anodes and cathodes can be constructed according to FIG. 1A through FIG. 1D.

FIG. 1F is a schematic diagram of a capacitor that includes the electrode assembly of FIG. 1E positioned in a capacitor case.

FIG. 1G is a sideview of an interface between an anode and a cathode that are adjacent to one another in the capacitor of FIG. 1F.

FIG. 2A through FIG. 2I illustrate a method of generating an anode for use in a capacitor constructed according to FIG. 1A through FIG. 1G. FIG. 2A is a top view of a sheet of material from which the anode is constructed. The sheet of material can be a sheet of an anode metal.

FIG. 2B is a portion of a cross section of the sheet of material showing an interface between the side of the sheet of material and the atmosphere in which the sheet of material is positioned.

FIG. 2C illustrates the sheet of material of FIG. 2B after the formation of preliminary channels in the sheet of material.

FIG. 2D illustrates the sheet of material of FIG. 2C after widening the preliminary channels.

FIG. 2E illustrates the sheet of material of FIG. 2C after formation of an anode metal oxide on the exposed surfaces of an anode metal.

FIG. 2F illustrates an example of a compression mechanism for performing a thermal compression operation on the sheet of material.

FIG. 2G illustrate an anode extracted from the sheet of material shown in FIG. 2F.

FIG. 2H is a top view of a portion of a sheet of material having a laser pathway with multiple different tracks.

FIG. 2I illustrates a capacitor that includes the anode of FIG. 2G.

FIG. 3A is a Scanning Electron Microscope image of an anode precursor with re-solidified material present at the edge of the anode precursor.

FIG. 3B is a Scanning Electron Microscope image of an anode precursor with re-deposited material present at the edge of the anode precursor.

FIG. 3C is a Scanning Electron Microscope of an anode precursor where both re-solidified material and re-deposited material are absent from the edge of the anode precursor.

FIG. 3D is a Scanning Electron Microscope of an anode precursor where both re-solidified material and re-deposited material are absent from the edge of the anode precursor.

DESCRIPTION

Figure 1F:
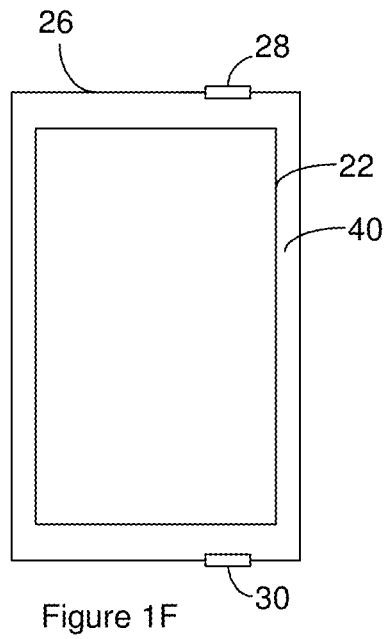

The anodes for a capacitor can be cut from a sheet of material having a layer of an anode metal oxide on an anode metal. The layer of anode metal oxide can be formed on the anode metal by alternating oxide formation operations with thermal treatments. The oxide formation operation(s) form the anode metal oxide on the anode metal. The thermal treatment(s) elevate the temperature of the sheet of material so as to drive water out of the anode metal oxide. The removal of this water has been shown to improve leakage in capacitors. However, when the temperature of the sheet of material is elevated to too high of a temperature and/or for too long of a time, the level of deformation can increase. Deformation is a measure of how the amount of energy required to charge the capacitor changes over time.

The thermal treatments can each include one or more thermal compression operations. Thermal compression can include heating of the sheet of material while compressing at least a portion of the sheet of material between multiple compression members. The direct contact between the compression members and the sheet of material provides a highly efficient transfer of thermal energy to the sheet of material. As a result, the exposure of the sheet of material to elevated temperatures during the thermal treatment can be performed at lower temperatures and/or for lower times. Accordingly, the use of thermal compression may be able to remove water from the anode metal oxide while also reducing deformation. As a result, the thermal compression can provide acceptable levels of deformation and leakage.

Additionally, thermal compression can reduce warping of the sheet of material that occurs in response to processes used to fabricate of the sheet of material. The flattening of the sheet of material by thermal compression can improve the processes used for extracting electrodes from the sheet of material. Capacitor anodes can be cut from the sheet of material using mechanical methods such as die cutting or using non-contact methods such as laser cutting. Mechanical cutting of a warped sheet of material can cause the sheet of material to move in response to the cutting operation. Laser cutting of a warped sheet of material causes the distance between the focal point and the sheet of material to change across the sheet of material. As a result, cutting of warped sheets of material provides inconsistent results. The flattening of the sheet of material provided by thermal compression can reduce or eliminate these problems and increase the consistency of the cutting results.

The inventors have found that using lasers to cut anodes from the sheet of material can eliminate the mechanical damage, cracking, broken particles and the iron contamination associated with die cutting. As a result, laser cutting can provide an increase in yield and efficiency that translates into cost savings. The use of laser cutting also offers the advantages of a process where changes in cutting dimensions from routine die wear are eliminated. Additionally, the size of the anodes can be changed simply by changing software instead of the delay associated with mechanical die change outs and/or the obtaining of new dies.

The inventors have also found that laser cutting anodes from a sheet of material can be a source of DC leakage ("leakage"). For instance, portions of the sheet of material that melt during laser cutting can solidify and stay on the resulting anode. Additionally or alternately, portions of the sheet can redeposit on the resulting anode. These excess materials can be a source of leakage and/or deformation in the capacitor. Leakage is the amount of electrical current through the capacitor when a voltage is applied across the capacitor. Deformation is a measure of how the amount of energy required to charge the capacitor changes over time. Accordingly, increases in leakage and/or deformation are negative features for capacitor performance. The inventors have found that leakage and/or deformation can be decreased by selecting variables of the laser beam itself and/or by adjusting variables of the path that the laser beam travels across the sheet of material.

The sheet of material from which the anodes are cut typically has a layer of an anode metal oxide on a layer of an anode metal. The anode metal oxide is generally an oxide of the anode metal. The inventors have found that laser cutting of the anodes from the sheet of material causes the first phase of the anode metal oxide to be converted to a second phase of the anode metal oxide.

In capacitors, such as electrolytic capacitors, the first phase operates as the dielectric for the capacitor. However, the second phase is often more electrically conductive than the first phase. For instance, the second phase can be a conductor or a semiconductor while the first phase is a dielectric. This increase in conductivity is another source of leakage in the capacitor. As an example, when the anode metal is aluminum, the oxide can be aluminum oxide. However, aluminum oxide can exist in one of several phases while in the same state. A first phase of solid aluminum oxide is called boehmite aluminum hydroxide ($Al_2O_3$) and acts as a dielectric. A second phase of solid aluminum oxide is called alpha phase corundum oxide ($\alpha$-$Al_2O_3$) and can act as a semiconductor. The inventors have found that laser cutting can convert the boehmite aluminum hydroxide ($Al_2O_3$) to the alpha phase corundum oxide ($\alpha$-$Al_2O_3$). This conversion has been found to be another source of capacitor leakage and deformation. Additionally, it has proven to be difficult to convert the alpha phase corundum oxide ($\alpha$-$Al_2O_3$) back to boehmite aluminum hydroxide ($Al_2O_3$).

The inventors have found that an oxide phase extraction can be used to remove at least a portion of the second phase of the anode metal oxide from the anode. For instance, the inventors have found that causing a reaction between one or more components in an electrolyte in the capacitor and the second phase of the anode metal oxide can move the second phase of the anode metal oxide off of the anode and into the electrolyte. The inventors have found that removal of the second phase of the anode metal oxide from the anodes reduces the leakage associated with the capacitor and accordingly reduces the deformation associated with the capacitor.

Capacitor deformation is an important measure for capacitor applications where access to charging sources such as batteries is highly limited. An example of such an application is implantable medical devices such as Implantable Cardioverter Defibrillators (ICDs). ICDs include a battery that charges the capacitors that are used to store the energy for defibrillation shocks that are delivered to a patient. Reduced levels of deformation for the capacitors used in ICDs means that the amount of energy required to charge the capacitors is reduced. Accordingly, the reduced levels of deformation can increase the battery life and/or permit the battery size to be reduced.

FIG. 1A through FIG. 1G illustrate the construction of a capacitor. FIG. 1A is a sideview of an anode 10 that is suitable for use in the capacitor. FIG. 1B is a cross-section of the anode 10 shown in FIG. 1A taken along the line labeled B in FIG. 1A. The anode 10 includes, consists of, or consists essentially of a layer of anode metal oxide 12 over a layer of an anode metal 14. Suitable anode metals 14 include, but are not limited to, aluminum, tantalum, magnesium, titanium, niobium, and zirconium. As illustrated in FIG. 1B, in some instances, the anode metal oxide 12 surrounds the anode metal 14 in that the anode metal oxide 12 is positioned on both the edges and the faces of the anode metal 14. Many anode metal oxides 12 can exist in more than one phase within the same material state (solid, liquid, gas, plasma). For instance, an anode metal oxide 12 such as aluminum oxide can be in a boehmite phase ($Al_2O_3$) that is a solid or in alpha phase corundum oxide phase ($\alpha$-$Al_2O_3$) that is also a solid.

FIG. 1C is a sideview of a cathode 16 that is suitable for use in the capacitor. FIG. 1D is a cross-section of the cathode 16 shown in FIG. 1C taken along the line labeled D in FIG. 1C. The cathode 16 includes a layer of cathode metal oxide 18 over a layer of a cathode metal 20. Suitable cathode metals 20 include, but are not limited to, aluminum, titanium, stainless steel. Although not illustrated, the cathode metal can be layer of material on a substrate. For instance, the cathode metal can be a titanium or titanium nitride coating on a substrate such as a metal and/or electrically conducting substrate. Examples of suitable substrates include, but are not limited to, aluminum, titanium, and stainless steel substrates. The cathode metal oxide 18 can be formed on the cathode metal 20 by oxidizing the cathode metal 20 in air. The cathode metal 20 can be the same as the anode metal 14 or different from the anode metal 14. In some instances, the cathode metal 20 and the anode metal 14 are both aluminum. As illustrated in FIG. 1D, in some instances, the cathode metal oxide 18 surrounds the cathode metal 20. For instance, the cathode metal oxide 18 is positioned over the edges and faces of the cathode metal 20.

The anodes 10 and cathodes 16 are generally arranged in an electrode assembly 22 where one or more anodes 10 are alternated with one or more cathodes 16. For instance, FIG. 1E is a cross section of an electrode assembly 22 where anodes 10 are alternated with cathodes 16. The anodes 10 and cathodes 16 can be constructed according to FIG. 1A through FIG. 1D. A separator 24 is positioned between anodes 10 and cathodes 16 that are adjacent to one another in the electrode assembly 22. The electrode assembly 22 typically includes the anodes 10 and cathodes 16 arranged in a stack or in a jelly roll configuration. Accordingly, the cross section of FIG. 1E can be a cross section of an electrode assembly 22 having multiple anodes 10 and multiple cathodes 16 arranged in a stack. Alternately, the cross section of FIG. 1E can be created by winding one or more anodes 10 together with one or more cathodes 16 in a jelly roll configuration. However, as the anodes become more brittle due to increased surface area, it may not be practical or possible to form a jelly-roll configuration. Suitable separators 24 include, but are not limited to, kraft paper, fabric gauze, and woven for non-woven textiles made of one or a composite of several classes of nonconductive fibers such as aramids, polyolefins, polyamides, polytetrafluoroethylenes, polypropylenes, and glasses.

The electrode assembly 22 is included in a capacitor. For instance, FIG. 1F is a schematic diagram of a capacitor that includes the electrode assembly 22 of FIG. 1E positioned in a capacitor case 26. Although not illustrated, the one or more anodes in the electrode assembly 22 are in electrical communication with a first terminal 28 that can be accessed from outside of the capacitor case 26. The one or more cathodes 16 in the electrical assembly are in electrical communication with a second terminal 30 that can be accessed from outside of the capacitor case 26. In some instances, the one or more anodes include or are connected to tabs (not shown) that provide electrical communication between the one or more anodes and the first terminal 28 and the one or more cathodes 16 include or are connected to tabs (not shown) that provide electrical communication between the one or more cathodes 16 and the second terminal 30. The capacitor can include one or more electrical insulators (not shown) positioned as needed to prevent shorts-circuits within the capacitor.

Figure 1G:
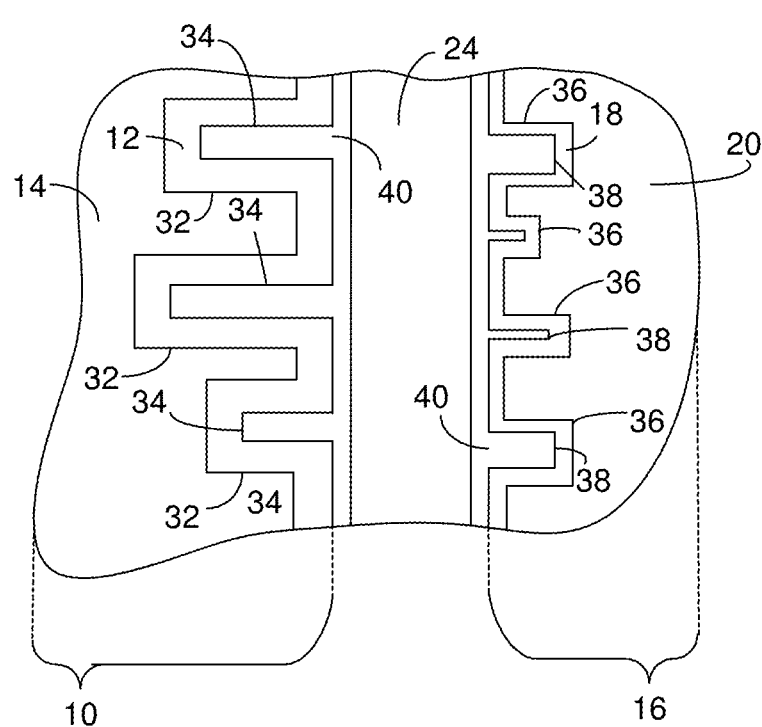

FIG. 1G is a sideview of an interface between an anode 10 and a cathode 16 that are adjacent to one another in the capacitor of FIG. 1F. The illustration in FIG. 1G is magnified so it shows features of the anode 10 and cathode 16 that are not shown in FIG. 1A through FIG. 1E. The face of the anode 10 includes channels 32 that extend into the anode metal 14 so as to increase the surface area of the anode metal 14. Although the channels 32 are shown extending part way into the anode metal, all or a portion of the channels 32 can extend through the anode metal. Suitable channels 32 include, but are not limited to, pores, trenches, tunnels, recesses, and openings. In some instances, the channels 32 are configured such that the anode has a number of channels/area greater than or equal to 30 million tunnels/cm$^2$. Increasing the number of channels has been shown to increase the brittleness of the anodes and the sheet of material from which the anodes are extracted. Accordingly, increasing the surface area of the anode can result in a more brittle anode or sheet of material. The anode metal oxide 12 is positioned on the surface of the anode metal 14 and is positioned in the channels 32. The anode metal oxide 12 can fill the channels 32 and/or anode oxide channels 34 can extend into the anode metal oxide 12. However, it is generally not desirable for the anode metal oxide 12 to fill the channels 32 because filling the channels 32 can lead to reduced capacitance and electrical porosity.

The surface of the cathode 16 optionally includes cathode channels 36 that extend into the anode metal 14 so as to increase the surface area of the anode metal 14. Suitable cathode channels 36 include, but are not limited to, pores, trenches, tunnels, recesses, and openings. The cathode metal oxide 18 can be positioned on the surface of the cathode metal 20. When the cathode metal 20 includes cathode channels 36, the cathode metal oxide 18 can be positioned in the cathode channels 36. The cathode metal oxide 18 can fill the cathode channels 36 and/or cathode oxide channels 38 can extend into the cathode metal oxide 18.

An electrolyte 40 is in contact with the separator 24, the anode 10 and the cathode 16. The electrolyte 40 can be positioned in the cathode oxide channels 38. When the cathode metal 20 includes cathode oxide channels 38, the electrolyte 40 can be positioned in the cathode oxide channels 38. The electrolyte 40 can be a liquid, solid, gel or other medium and can be absorbed in the separator 24. The electrolyte 40 can include one or more salts dissolved in one or more solvents. For instance, the electrolyte 40 can be a mixture of a weak acid and a salt of a weak acid, preferably a salt of the weak acid employed, in a polyhydroxy alcohol solvent. The electrolytic or ion-producing component of the electrolyte 40 is the salt that is dissolved in the solvent.

A capacitor constructed according to FIG. 1A through FIG. 1G can be an electrolytic capacitor such as an aluminum electrolytic capacitor, a tantalum electrolytic capacitor or a niobium electrolytic capacitor. An electrolytic capacitor is generally a polarized capacitor where the anode metal oxide 12 serves as the dielectric and the electrolyte 40 effectively operates as the cathode 16.

Figure 2A:
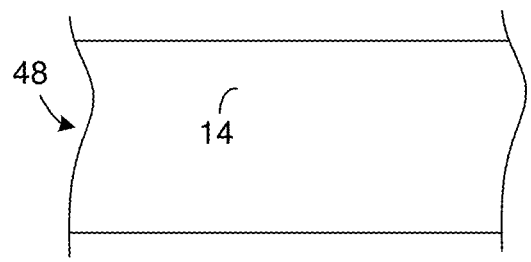
Figure 2B:
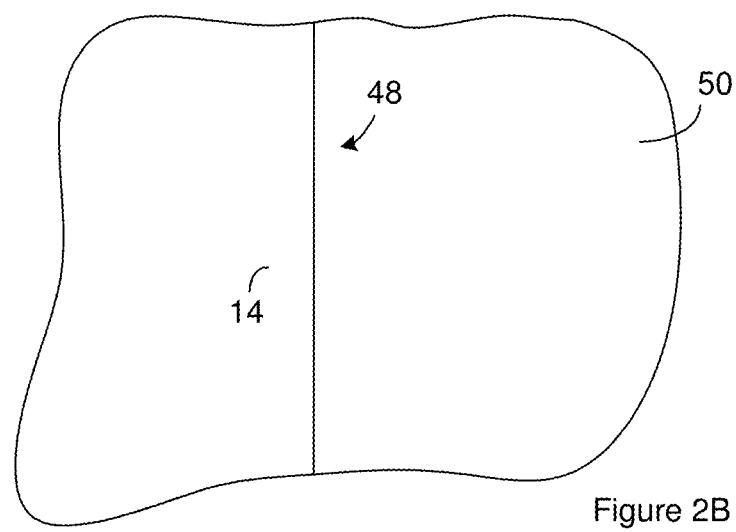
Figure 2C:
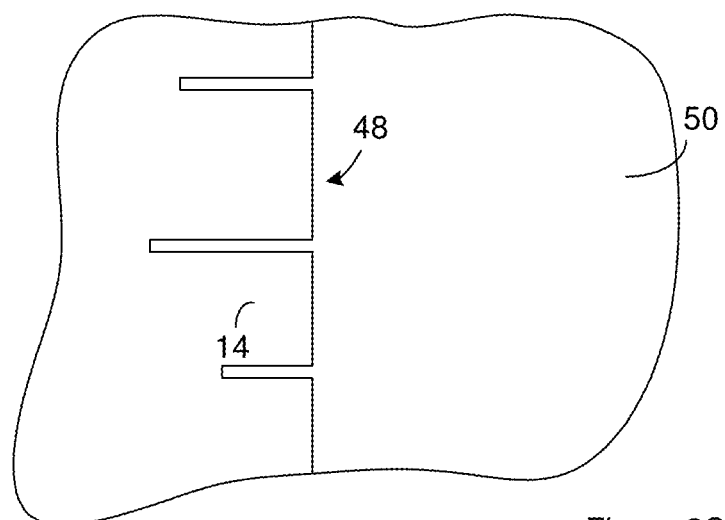
Figure 2D:
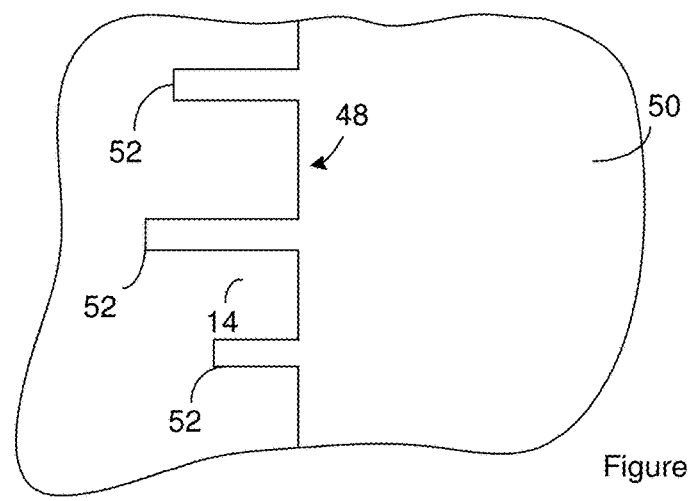
Figure 2E:
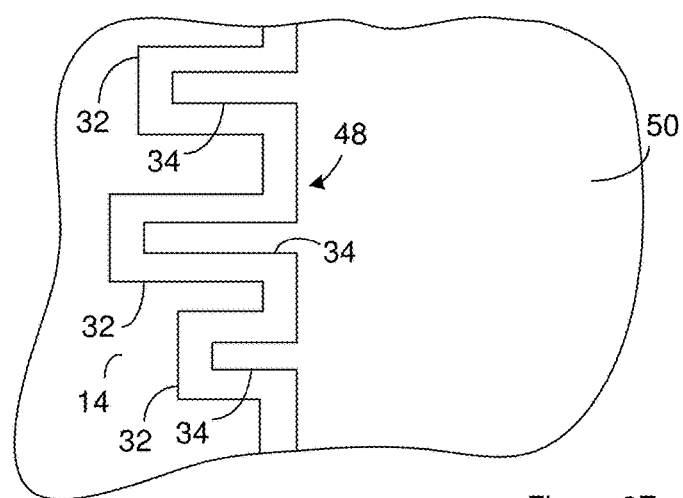

FIG. 2A through FIG. 2I illustrate a method of generating an anode for use in a capacitor constructed according to FIG. 1A through FIG. 1G. A sheet of material 48 can be acquired either by fabrication or purchase from a supplier. As will be evident below, one or more anodes are constructed from the sheet of material 48. FIG. 2A is a top view of the sheet and shows a face of the sheet positioned between edges. FIG. 2B is a portion of a cross section of the sheet showing an interface between the face of the sheet of material 48 and the atmosphere 50 in which the sheet is positioned. The sheet of material 48 can include, consist of, or consist essentially of the anode metal 14.

A surface area enhancement phase can be performed so as to increase the surface area of the sheet of material 48. For instance, preliminary channels 52 can be formed in the sheet of material 48 so as to provide the sheet of material 48 with the cross section of FIG. 2C. Suitable methods of forming the preliminary channels 52 include, but are not limited to, laser removal and/or drilling, etching such as chemical etching and electrochemical etching. In one example, the etching is electrochemical etching or electrochemical drilling. In electrochemical etching and/or electrochemical drilling, the sheet of material 48 is at least partially immersed in a bath that includes, consists of, or consists essentially of an electrochemical drilling (ECD) solution initially having a pH of less than 5 while passing an electrical current through the sheet of material 48. Additional examples of suitable methods for forming the preliminary channels 52 and/or additional details of suitable methods of electrochemical etching and/or electrochemical drilling can be found in U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser. No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

In some instances, the surface area enhancement phase also includes widening of the preliminary channels 52. Widening of the preliminary channels can reduce or stop the anode metal oxide 12 from filling the channels 32. For instance, the distance across the preliminary channels 52 on the sheet of FIG. 2C can be increased to provide a sheet of material 48 having the channels 32 shown in the cross section of FIG. 2D. In some instances, the preliminary channels 52 are formed and widened so as to remove more than 52% or 60% of the sheet of material 48 from the sheet of material 48 and/or to create more than 30 million channels/cm$^2$ of the sheet of material 48.

Suitable methods for widening the preliminary channels 52 include, but are not limited to, chemical and electrochemical processes. In one example of the widening process, widening of the preliminary channels 52 includes immersing at least a portion of the sheet of material 48 in an electrolyte solution that includes, consists of, or consists essentially of a chloride or nitrate. Additional examples of suitable methods for widening of the preliminary channels 52 and/or additional details about the above methods of widening preliminary channels 52 can be found in U.S. patent application Ser. No. 05/227,951, filed on Feb. 22, 1972, granted U.S. Pat. No. 3,779,877, and entitled "Electrolytic Etching of Aluminum Foil;" U.S. patent application Ser. No. 06/631,667, filed on Jul. 16, 1984, granted U.S. Pat. No. 4,525,249, and entitled "Two Step Electro Chemical and Chemical Etch Process for High Volt Aluminum Anode Foil;" U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser.

No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

The anode metal oxide 12 is formed on the anode metal 14 that is exposed in the sheet of material 48. For instance, the anode metal oxide 12 can be formed on the anode metal 14 that is exposed in FIG. 2D so as to provide a sheet of material 48 according to FIG. 2E. The anode metal oxide 12 extends into the channels 32 so as to provide anode oxide channels 34. Forming the anode metal oxide 12 on the exposed anode metal 14 can include converting a portion of the existing anode metal 14 to the anode metal oxide 12 or adding a layer of the anode metal 14 over the previously existing anode metal 14. Converting a portion of the existing anode metal 14 to the anode metal oxide 12 can include reacting the anode metal 14 with a component such as oxygen. The anode metal oxide 12 is formed so the anode metal oxide 12 is in a first phase of the anode metal oxide 12. As an example, when the anode metal 14 is aluminum, the boehmite phase ($Al_2O_3$) of aluminum oxide is formed as the anode metal oxide 12. The first phase of the anode metal oxide 12 is desirable for the final capacitor. For instance, the first phase of the anode metal oxide 12 generally serves as the dielectric for the capacitor.

An example of a suitable method of forming the anode metal oxide 12 on the anode metal 14 includes an optional hydration layer formation operation, one or more oxide formation operations, and one or more thermal treatments.

The hydration layer formation operation forms a hydration layer in direct contact with the anode metal 14. The hydration layer can include, consist of, or consist essentially of the anode metal 14, hydrogen, and water. For instance, the hydration layer can include, consist of, or consist essentially of a hydrate of the anode metal 14. When the anode metal 14 is aluminum, the hydration layer can include, consist of, or consist essentially of aluminum hydrate.

In some instances, the hydration layer is formed on the anode metal 14 by placing the sheet of material 48 in a bath liquid that includes, consists of, or consists essentially of water. In one example, the bath liquid is de-ionized water. The bath liquid may be held at a temperature between 60° C. and 100° C. In some instances, the bath liquid is maintained at about 95° C. The sheet of material 48 can remain in the bath liquid for a formation time. The formation time can be greater than 1 minute and/or less than 20 minutes. The hydration can help form a better quality oxide during the one or more oxide formation operations.

An example of a suitable oxide formation operation includes, but is not limited to, mechanisms that convert existing anode metal 14 to anode metal oxide 12 such as anodic oxidation. In anodic oxidation, the sheet of material 48 is placed in an electrolytic bath while a positive voltage is applied to the sheet of material 48. The thickness of the layer of anode metal oxide 12 can be increased by increasing the applied voltage. When the anode metal 14 is aluminum, anodic oxidation forms a layer of the boehmite phase of aluminum oxide ($Al_2O_3$) on a layer of aluminum. In one example of anodic oxidation, the anode metal oxide 12 is formed by placing the sheet of material in citric acid while a positive voltage of 400-550 volts is applied to the sheet of material for a period of time between 30 minutes to 150 minutes. Additionally or alternatively, the electrical current that results from the applied voltage can be monitored and the sheet of material can be removed from the electrolytic solution in response to the electrical current exceeding a treatment threshold.

The layer of oxide formed during the first oxide formation operation performed on the sheet of material replaces and/or consumes the hydration layer formed during the hydration layer formation operation. As a result, the hydration layer is generally not present on the layer of material after the first oxide formation operation.

In some instances, the thermal treatments are each performed after an oxide formation operation. The thermal treatments elevate the temperature of the sheet of material enough to drive out water from the layer of anode metal oxide 12 formed during the previous oxide formation operation(s). The removal of this water has been shown to decrease the leakage of capacitors. However, it is not desirable to remove all of the water from the layer of anode metal oxide 12. Additionally, applying high levels of thermal energy to the sheet of material can increase the level of deformation in a capacitor that includes an electrode made from the sheet of material. As a result, reducing the amount of thermal energy applied to the sheet of material while removing this water may lead to both decreased leakage and decreased deformation.

A suitable thermal treatment includes one or more thermal compression operations. An example of a suitable thermal compression operation is compressing the sheet of material between surfaces for a compression time with at least one of the surfaces having an elevated temperature during the compression.

Figure 2F:
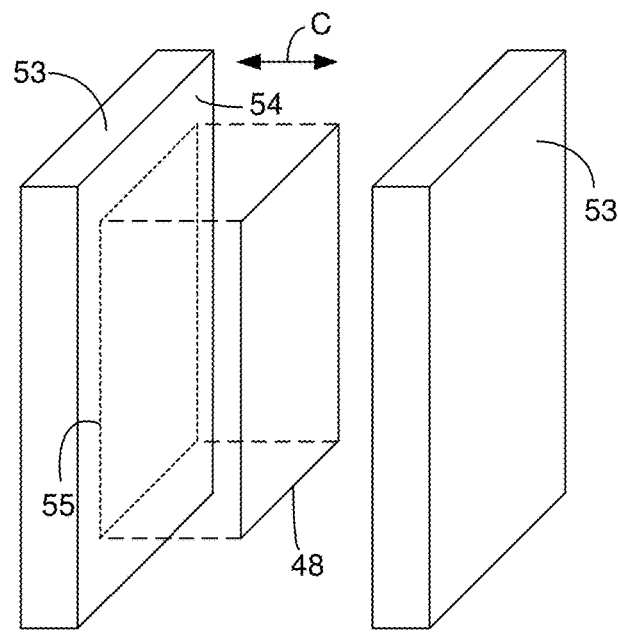
Figure 2F:
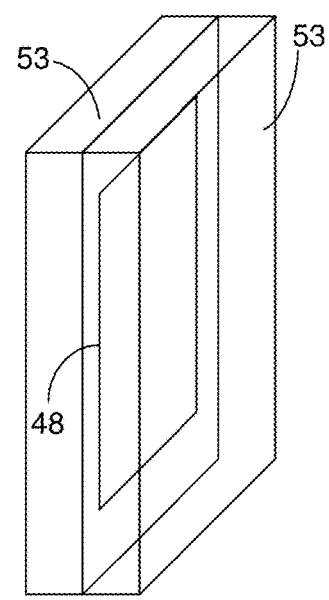

FIG. 2F illustrates an example of a compression mechanism for performing a compression operation. The compression mechanism includes two compression members. In FIG. 2F, a metal plate serves as each of the compression members. Each of the compression members includes a compression surface that is in direct contact with the sheet of material during the compression operation. A contact portion of each compression surface is the portion of the surface that is in contact with the sheet of material during the compression operation. The location of the contact portion on one of the compression members in diagram A of FIG. 2F is illustrated by dashed lines.

As is evident from the arrow labeled C in FIG. 2F, the compression members can be moved relative to one another. For instance, a first one of the compression members can be immobilized while the second compression member is moved relative to the first compression member. Alternately, both of the compression members can be moved.

To prepare for the compression operation, the sheet of material is placed between the compression members as shown in diagram A of FIG. 2F. The compression members are then moved relative to one another so the contact portion of each compression surface is in direct physical contact with the sheet of material as shown in diagram B of FIG. 2F. The compression surfaces apply pressure to the sheet of material during the compression operation. The compression operation continues for the compression time that is desired for the compression operation. After the compression time associated with the last compression operation is reached, the compression members can be moved apart and the sheet of material removed from between the compression members.

Although FIG. 2F shows the compression members as plates, the compression members can be other components. For instance, one of the compression members can be the side of an oven or the side of some other structure. Additionally or alternatively, the compression members can be different structures. For instance, one of the compression members can be a plate as shown in FIG. 2F while another compression member is a side of an oven.

Although FIG. 2F shows the compression members as being independent of one another, the compression members may be physically connected to one another. For instance, the compression members can be hinged or can be different parts of a medium that is connected by a fold.

One or more of the compression members apply thermal energy to the sheet of material during a compression operation. For instance, the one or more compression members can heat the sheet of material during a compression operation. As an example, the contact portion of one or more of the compression surface can be at a compression temperature that is above room temperature. One or more of the compression members can include a heating mechanism for bringing the contact portion of a compression surface to the desired compression temperature. For instance, a resistive heater can be mounted on a plate that serves as a compression member. Alternately, a plate that serves as a compression member can include one or more channels through which a heated fluid is flowed. In some instances, the heating mechanism for bringing one or more of the compression surfaces to the desired compression temperature can be external to one or more of the compression members. For instance, the compression members can be located in an oven before and during the compression treatment. As an example, the compression members illustrated in FIG. 2F can be located in an oven before and during the compression treatment. The oven can be maintained at the compression temperature in order to keep the temperature of the contact portion of the compression surfaces at the desired compression temperature.

Each of the compression operations in a thermal treatment is performed for a compression time. The compression times associated with different compression operations can be the same or different. In some instances, the compression time is not long enough for the temperature of the sheet of material to reach the compression temperature. Accordingly, the temperature of the sheet of material at the end of the compression operation (final operation temperature) can be different from the compression temperature.

During a compression operation, a suitable pressure for applying to the sheet of material (compression pressure) is a pressure greater than 0.1 ounce per square inch or 1 ounce per square inch and/or less than 0.1 psi or 0.5 psi. During a compression operation, a suitable compression temperature for applying to the sheet of material is a temperature greater than 200° C., or 300° C., and/or less than 600° C., or 800° C. In some instances, the maximum temperature of the sheet of material during a compression operation is greater than 200° C., or 300° C., and/or less than 600° C., or 800° C. Suitable compression times include, but are not limited to, compression times greater than 1 second, 5 seconds and/or less than 10 seconds, 1 minute or ten minutes. In some instances, the compression pressure and/or compression temperature are held constant for the compression time during a compression operation.

In one example, a thermal treatment includes at least two compression operations performed at different pressure levels. A first one of the compression operations can be a low pressure compression and a second one of the compression operations can be a high pressure compression. The low pressure compression is performed at a lower compression pressure than the high pressure compression. In some instances, the high pressure compression is performed immediately after the low pressure compression without removing the sheet of material from between the compression members and without other compression operations being performed between the low pressure compression and the high pressure compression.

The low pressure compression can take advantage of the direct physical contact between the compression members and the sheet of material in order to quickly elevate the temperature of the sheet of material toward a final operation temperature that is desired for the start of the high pressure compression. Suitable compression pressures for the low pressure compression include, but are not limited to, pressures greater than 0.1 ounce per square inch or 1 ounce per square inch and/or less than 0.1 psi or 0.5 psi. Suitable compression temperatures for the low pressure compression include, but are not limited to, temperatures greater than 200° C., or 300° C., and/or less than 600° C., or 800° C. Suitable final operation temperatures for the low pressure compression include, but are not limited to, temperatures greater than temperatures greater than 200° C., or 300° C., and/or less than 600° C., or 800° C. Suitable compression times for the low pressure compression include, but are not limited to, times greater than 1 second, 5 seconds and/or less than 10 seconds, 1 minute or ten minutes. In some instances, the sheet of material is at or near room temperature before the low pressure compression. In some instances, the compression pressure and/or compression temperature are held constant or substantially constant for the compression time during the low pressure compression.

The high pressure compression can be performed for a duration that drives out the water from the layer of anode metal oxide 12 and/or that causes cracks to form in the anode metal oxide 12. Suitable compression pressures for the high pressure compression include, but are not limited to, pressures greater than 0.5 psi and/or less than 1.0 psi or 2.0 psi. Suitable compression temperatures for the high pressure compression include, but are not limited to, temperatures greater than 200° C., or 300° C., and/or less than 600° C., or 800° C. Suitable compression times for the high pressure compression include, but are not limited to, times greater than 1 second, 2 seconds and/or less than 10 seconds, 1 minute or ten minutes. In some instances, the compression temperatures for the high pressure compression are the same as the compression temperature for the low pressure compression. In some instances, the compression pressure and/or compression temperature are held constant or substantially constant for the compression time during the low pressure compression.

The increase in pressure between the low pressure compression and the high pressure compression can be done slowly. For instance, the increase in pressure can be at a rate greater than 0.0 psi/minute or 0.05 psi/min and/or less than 0.5 psi/min or 2 psi/min.

Various features of the method of forming the sheet of material as disclosed in the context of FIG. 2A through FIG. 2F cause the sheet of material to warp. For instance, the channels 32 are generally not evenly distributed across the sheet of material. Further, the morphology of these channels (i.e. straight channels, branched channels, etc.) is also not evenly distributed across the sheet of material. Additionally, forming the anode metal oxide 12 during the one or more oxide formation operations generally causes the sheet of material to shrink. For instance, the one or more oxide formation operations performed while forming the anode metal oxide 12 cause the volume of the sheet of material to decrease by as much as 15%. In some instances, the one or more oxide formation operations performed while forming the anode metal oxide 12 cause the volume of the sheet of material to decrease by more than 0.5%, or 1.5% and/or less than 4.5%, or 15%. The uneven distribution of the channels 32 combined with shrinkage of the sheet of material while forming the anode metal oxide 12 in these channels 32 causes warping of the sheet of material. Other sources of warping include, but are not limited to, the high voltages applied to the sheet of material during any anodic oxidation operations. Warped sheet of material tend to have multiple different peaks and valleys. In some instances, the peaks and valleys have widths on the order of 0.1 to 0.5 inches.

The thermal compression(s) in the thermal treatment can reduce warping of the sheet of material. The elevated temperature combined with the compression causes the sheet of material to adopt the shape of the interface between the contact portions of each compression surface. For instance, in FIG. 2F, the contact portions are each flat or planar. As a result, when the sheet of material adopts the shape of the interface, the sheet of material becomes flat or planar.

In some instances, one or more of the thermal treatments used while forming the anode metal oxide excludes a compression operation. For instance, as few as one of the thermal treatments performed while forming the anode metal oxide can include a compression operation while all other thermal treatments each exclude a compression operation. An example of a thermal treatment that excludes compression can include placing a sheet of material in an oven at a thermal treatment temperature for a thermal treatment time but without compression of the sheet of material. Suitable thermal treatment temperatures include, temperatures greater than 100° C., or 300° C. and/or less than 600° C., or 800° C. Suitable thermal treatment times include, times greater than 10 second, 30 seconds, or 3 minutes and/or times less than 5 minutes or 20 minutes.

When the method of forming the anode metal oxide 12 on the anode metal 14 includes a hydration layer formation operation, the hydration layer formation operation can be performed before the one or more oxide formation operations and before the one or more thermal treatments. When the method of forming the anode metal oxide 12 includes multiple oxide formation operations, the one or more thermal treatments can be alternated with the oxide formation operations. When the method of forming the anode metal oxide 12 on the anode metal 14 includes a hydration layer formation operation, the first oxide formation operation can be performed between the hydration layer formation operation and the first thermal treatment. Additionally or alternately, the last oxide formation operation can be performed after the last thermal treatment or the thermal treatment can be performed after the last oxide formation operation. In one example of the method of forming the anode metal oxide 12, the first oxide formation operation is performed between a hydration layer formation operation and the first thermal treatment; the one or more thermal treatment are alternated with the one or more oxide formation operations; and the last oxide formation operation is performed after the last thermal treatment. In another example of the method of forming the anode metal oxide 12, the first oxide formation operation is performed between a hydration layer formation operation and the first thermal treatment; the one or more thermal treatments are alternated with the one or more oxide formation operations; and the last thermal treatment operation is performed after the last oxide formation.

FIG. 2A through FIG. 2F illustrate a method of using fabrication to acquire a sheet of material 48 having a first phase of an anode metal oxide 12 on an anode metal 14. Alternately, any stage of the sheet of material 48 shown in FIG. 2A through FIG. 2F can be acquired by purchase from a supplier.

One or more anode precursors 56 are extracted from the sheet of material 48. Accordingly, a portion of the sheet of material 48 serves as the anode precursor 56. Suitable methods of removing an anode precursor 56 from the sheet of material 48 include, but are not limited to cutting the anode precursor 56 out of the sheet of material 48. A suitable method of cutting the anode precursor 56 out of the sheet of material 48 include mechanical cutting method such as die cutting where the anode precursor is punched or stamped from a sheet of material using a mechanical die. Another suitable method of cutting the anode precursor 56 out of the sheet of material 48 includes no-contact cutting methods such as laser cutting of the anode precursor 56. FIG. 2G illustrates use of a laser 58 to cut anode precursors 56 out of a sheet of material 48 constructed according to FIG. 2F.

The flat or planar shape of the sheet of material provided by thermal compression can improve the cutting processes. Mechanical cutting of a warped sheet of material can cause the sheet of material to move in response to the cutting operation. Laser cutting of a warped sheet of material causes the distance between the focal point and the sheet of material to change across the sheet of material. As a result, cutting of warped sheets of material provides inconsistent results. The flattening of the sheet of material provided by thermal compression can increase the consistency of the cutting results.

As noted above, laser cutting may provide an increase in yield and efficiency when compared with mechanical cutting methods. Laser cutting of the sheet of material can cause melted portions of the sheet of material to solidify and stay on the resulting anode precursor. Alternately, portions of the sheet can redeposit on the resulting anode precursor during the laser cutting process. These excess materials can be reduced by using a pulsed laser beam. The short pulse durations that are possible with pulsed lasers can provide very high peak powers for moderately energetic pulses. The increased peak power can provide vaporization of the sheet of material during the laser cutting process. This vaporization can eject the material from any recess or trench created in the sheet of material through the top of the sheet of material. Since the material is ejected from the sheet of material, the material is not available to re-solidify or re-deposit on the sheet of material.

In some instances, the duration of the pulse is greater than 0 s, or a femtosecond ($10^{-15}$ s) and/or less than a microsecond ($10^{-6}$ s). In one example, the duration of the pulse is greater than 100 femtoseconds and less than 900 femtoseconds. The time between pulses is inversely related to the pulse frequency. Suitable pulse frequencies can be greater than 0 Hz, or 100 Hz, and/or less than 2000 kHz. In one example, the pulse frequency is in a range of 200 kHz to 600 kHz. In some instances, the duration of the pulse is greater than 0 s, or a femtosecond ($10^{-15}$ s) and/or less than a microsecond ($10^{-6}$ s) and the pulse frequency is greater than 0 Hz, or 100 Hz, or 100 kHz and/or less than 2000 kHz.

The power density of the laser beam at the sheet of material can be at a level that a single pulse elevates the temperature of the sheet of material above the boiling point of the anode metal and vaporizes the anode metal. In some instances, power density of the laser beam is such that at least a portion of the sheet of material that is illuminated by the laser reaches the boiling point of the anode metal and vaporizes in a period of time less than or equal to the duration of one pulse when the illuminated portion of the sheet of material is at temperature (23° C. or 25° C.) before the pulse. In an example where the anode metal is aluminum, the pulse duration is 820 femtoseconds, the pulse frequency is 400,000 pulses per second, and the laser beam has a power density $7.99 \times 10^{11}$ W/cm$^2$ at the surface of the sheet of material. Suitable power densities include, but are not limited to, power densities greater than 0 W/cm$^2$, $1 \times 10^{11}$ W/cm$^2$, or $2 \times 10^5$ W/cm$^2$ and/or less than $9 \times 10^{11}$ W/cm$^2$, or $2 \times 10^5$ W/cm$^{12}$. The combination of elevated power densities and reduced pulse durations reduces the amount of heat transferred to the sheet of material. However, adjusting these parameters may not be sufficient to address the increase in deformation that can result from using laser cutting of the anodes rather than stamped or punched cutting of the anodes.

The path of the laser beam across the face of the sheet of material can be controlled by electronics and/or software. The electronics and/or software can move the laser beam relative to the sheet of material and/or the sheet of material relative to the laser beam. In FIG. 2G, the solid lines and the dashed lines that show the outline of an anode precursor in the sheet of material represent the laser beam pathway during the process of cutting the anode precursor from the sheet of material. As a result, the laser is incident on the anode metal oxide during at least a portion of the laser cutting.

The inventors have found that tuning the characteristics for the laser beam path across the sheet of material can also reduce the leakage and deformation to or even below the levels associated with stamping or punching of anodes. For instance, the rate at which the beam is scanned across the sheet of material can be tuned. Faster scan rates reduce the amount of energy that is absorbed by the anode precursor. In some instances, the laser beam is scanned across the sheet of material at a rate greater than 0 mm/sec, 100 mm/sec, or 600 mm/sec, and/or less than 900 mm/sec, or 1100 mm/sec.

Reducing the spot size can also reduce the amount of thermal energy transferred to the sheet of material. Suitable spot sizes include, but are not limited to, spots having a diameter or major axis greater than 10 microns, 30 microns and/or less than 50 microns, or 150 microns. Additionally or alternately, the spot size can be selected to produce spot overlaps less than 100%. A spot is the area of the sheet of material illuminated by the laser beam during a pulse. Spot overlap is the overlap of a spot with the spot provided by the previous pulse. Suitable spot overlaps include spot overlaps greater than 70%, or 90% and/or less than 100%. The spot size can be selected to provide these levels of spot overlap when combined with the above scan rates and pulse frequencies.

Increasing the beam scan rate can reduce the depth that the laser beam cuts into the sheet of material. As a result, multiple passes of the laser beam along a pathway may be necessary in order to completely cut the anode precursor out of the sheet of material. This result is evident in the pathway labeled P FIG. 2G. The pathway includes dashed lines that indicate where the laser beam has cut into the sheet of material without cutting through the sheet of material. The pathway also includes solid lines that indicate the portion of the anode precursor outline where the laser beam has cut through the sheet of material. Additionally, the arrow labeled A indicates the direction of travel for the laser beam relative to the anode precursor. At the start of the laser cutting, the laser beam may be incident on the anode metal oxide. Once the laser beam has cut through the anode metal oxide, the laser beam is incident on the anode metal.

The need for multiple passes of the laser beam in order to cut through the sheet of material means that each location along the beam pathway is not exposed to the leaser beam energy for a pass interval. The pass interval can be the time between passes of the laser beam and/or can be the period of time that passes between each point along the pathway being exposed to the laser beam. Suitable pass intervals include, but are not limited to, pass intervals more than 0.1 seconds per pass and/or less than 3 seconds per pass. In some instances, the pass interval is selected such that more than 5, or 10 and/or less than 100 passes of the laser beam around the entire outline of the anode precursor are required to completely extract an anode precursor from the sheet of material.

The laser pathway can include multiple different tracks. FIG. 2H is a top view of a portion of a sheet of material 48. A portion of a laser pathway on the sheet of material is labeled P. The laser pathway includes a first track 59 represented by dashed lines and a second track 60 represented by solid lines. The first track 59 represents the track that the laser follows during a pass along the laser pathway. The second track 60 represents the track that the laser follows during a different pass along the laser pathway. The first track 59 has a width labeled w and the second track 60 has a width labeled W. When the first track 59 and the second track 60 are followed by the same laser or by lasers with the same spot size, the width of the first track 59 will be the same or about the same as the width of the second track 60.

The second track 60 is offset from the first track 59 by a distance labeled OS in FIG. 2H. The amount of offset can be selected such that the second track 60 partially overlaps the first track 59 as shown in FIG. 2H. The use of partially overlapping tracks while laser cutting the anode precursor widens the trench that the laser forms in the sheet of material to a width larger than the spot diameter. The cutting of a wider trench can reduce the amount of thermal energy that is applied to previously formed surfaces in the trench. The track overlap percentage can be the overlap distance divided by the width of the overlapped track. Suitable track overlap percentages include, but are not limited to, track overlap percentages greater than 25% or 30% and/or less than 50% or 75%. The offset distance can be a function of spot size. For instance, when the spot size has a diameter of 40 microns, a suitable offset distance can be any distance between 0 and 40 microns, such as 10 to 30 microns.

In some instances, the different tracks extend around the perimeter of the anode and/or surround the perimeter of the anode. For instance, the entire length of the laser pathway shown in FIG. 2G can include two tracks that partially overlap, as shown in FIG. 2H. In other words, the laser pathway of FIG. 2H can represent the laser pathway of any straight portion of the laser pathway shown FIG. 2G. Accordingly, the laser can trace all, or substantially all, of the anode perimeter along one track and later trace all, or substantially all, of the anode perimeter along another track that partially overlaps the prior track, as described above. Alternately, different tracks can partially overlap along one or more portions of the anode perimeter but completely overlap along one or more other portions of the anode perimeter.

Although the laser pathway in FIG. 2H is illustrated as having two tracks, the laser pathway can include a single track or more than two tracks. During the laser cutting process, a track can be followed once or more than once. For instance, when a laser pathway includes two tracks as is shown in FIG. 2H, the laser can alternate between different tracks on subsequent passes. As an example, the laser can follow the first track 59, the second track 60, the first track 59, the second track 60, and so on until the trench extends through the sheet of material and the anode precursor is extracted from the sheet of material.

In some instances, the anode precursor is fabricated using one, two, three, four, five or six parameters selected from the group consisting of a laser pulse duration, pulse frequency, power density, scan rate, pass interval, and pass number. In these instances, the laser pulse duration is 400 femtoseconds, the laser pulse frequency is 400 kHz, the power density is $7.99 \times 10^{11}$ W/cm$^2$, the scan rate is 720 mm/sec, the pass interval is 0.25 seconds, and the pass number is 60.

The inventors have also found that the use of a laser to extract the one or more anode precursors 56 from the sheet of material 48 can convert at least a portion of the first phase of the anode metal oxide 12 to a second phase of the anode metal oxide 12. For instance, using a laser to cut a sheet of material 48 with aluminum as the anode metal 14 and the boehmite phase of aluminum oxide ($Al_2O_3$) as the anode metal oxide 12 can convert the boehmite phase of aluminum oxide to the alpha-corundum oxide ($\alpha$-$Al_2O_3$) phase of aluminum oxide. This conversion is believed to be a result of the heat generated during the laser cutting process. As a result, the conversion primarily occurs at and/or near the edge of the anode precursor 56. The second phase of the anode metal oxide 12 is often undesirable. For instance, the second phase of the anode metal oxide 12 can be more electrically conductive than the first phase of the anode metal oxide 12. As an example, the alpha corundum oxide ($\alpha$-$Al_2O_3$) phase of aluminum oxide has properties of a semiconductor. As a result, the alpha phase corundum oxide ($\alpha$-$Al_2O_3$) is not suitable for use as a dielectric and is accordingly associated with undesirably high levels of leakage and deformation. However, alpha phase corundum oxide ($\alpha$-$Al_2O_3$) is very stable and is difficult to convert back into the boehmite phase of aluminum oxide. While adjustments to the laser cutting parameters disclosed above can partially address the leakage and deformation associated with the this conversion from the first phase of the anode metal oxide to the second phase of the anode metal oxide, an oxide extraction phase discussed in more detail below can further reduce the leakage and deformation caused by this conversion.

The process of extracting the anode precursor 56 from the sheet of material 48 can leave the anode metal 14 exposed at the edges of the anode precursor 56. In some instances, a hydration layer is optionally formed on the exposed anode metal 14. The hydration process builds a non-voltage supporting hydration layer that helps to both create a higher quality anode metal oxide 12 and speed up its formation during a subsequent aging process. The hydration process lowers the aging time by using a hydration oxide backbone to speed formation of the anode metal oxide 12 during aging. In some instances, the hydration process cleans up the edges of anode precursor 56 by "smoothing" any metal burrs on the edges. The detachment of the burrs and "smoothing" can be increased by use of sonic or ultrasonic vibrational energy when forming the hydration layer.

A suitable method of creating the hydration layer includes, but is not limited to, immersing at least a portion of the anode precursor 56 in a bath that includes, consists of, or consists essentially of water. In one example, the water is de-ionized. The bath may be held at a temperature between 60 and 100 degrees C., and preferably at about 95 degrees C. The anode precursor 56 may remain immersed in the bath for a period of time greater than 2 minutes and/or less than 20 minutes to form the hydration layer. In some instances, the bath is sonicated at either sonic or ultrasonic frequencies. The formation of the hydration layer will help to form a better quality oxide during a subsequent aging process.

A passivation layer can optionally be formed on the exposed anode metal that is not covered by the anode metal oxide or the hydrate of the anode metal. A suitable method for forming the passivation layer includes, but is not limited to, immersing at least a portion of the anode precursor 56 in a second bath that includes, consists of, or consists essentially of ammonium dihydrogen phosphate. In some instances, the second bath is maintained at a temperature greater than 52° C. and/or less than 90° C., or 70° C. Additionally or alternately, the second bath can contain more than 0.1 wt %, or 5.0 wt %, and/or less than 2.0 wt % ammonium dihydrogen phosphate. The anode precursor 56 can be at least partially immersed in the second bath for a time greater than one minutes and/or less than four minutes. After removing the anode precursor 56 from the second bath, the anode precursor 56 can be rinsed under de-ionized water for a time greater than one minute and/or less than 12 minutes.

The one or more anode precursors 56 constructed according to FIG. 2A through FIG. 2G are included in a capacitor precursor 61 according to FIG. 2I. For instance, one or more of the anode precursors 56 are combined with one or more separators 24 and one or more cathodes 16 so as to form an electrode assembly 22 with the components arranged as disclosed in the context of FIG. 1A through FIG. 1E. The electrode assembly 22 is placed in a capacitor case 26 along with the electrolyte 40. Any electrical connections needed for operation of the capacitor precursor 61 are made and the capacitor case 26 is sealed.

The capacitor precursor 61 can optionally be put through an aging phase. The aging phase can be configured to form an anode metal oxide 12 on the edges of the one or more anode precursors 56 in the capacitor and/or on any other exposed anode metal 14. The aging process can use water in the electrolyte 40 to form the oxide. The phase of the anode metal oxide 12 formed during the aging phase is not necessarily the same as the first phase of the anode metal oxide 12. For instance, when the anode metal 14 is aluminum, the anode metal oxide 12 formed during the aging phase is not the boehmite phase but is similar. Suitable methods for aging the capacitor precursor 61 include, but are not limited to, holding the capacitor at an elevated temperature while charged. For instance, in some instances, aging includes holding the capacitor at a temperature greater than 50° C. or 70° C. and/or less than 100° C. or 200° C. for a time greater than 2 hours or 20 hours, and/or less than 50 hours or one hundred hours while charged to a voltage greater than 50 V or 200 V and/or less than 600 V or 800 V. In one example, aging includes holding the capacitor at about 85° C. for 24 to 36 hours while charged to about 400 V.

The capacitor precursor 61 can optionally be put through a testing phase. The testing phase can be configured to test the capacitor precursor 61 for charge and discharge functionality.

An oxide phase extraction is performed on the capacitor precursor 61. The oxide phase extraction can include an oxide removal stage that removes all or a portion of the second phase of the anode metal oxide from the anode precursor 56 and/or from the portion of the sheet of material 48 that serves as the anode precursor 56. In some instances, the oxide phase extraction moves all or a portion of the second phase of the anode metal oxide 12 from the anode precursor 56 into the electrolyte 40. The oxide phase extraction can be performed such that the first phase of the anode metal oxide 12 remains intact or remains substantially intact. The oxide phase extraction can also include an oxide restoration stage that forms the anode metal oxide 12 on exposed anode metal 14 and/or on areas where the anode metal oxide 12 is thin. As a result, the oxide restoration stage can restore the first phase of the anode metal oxide that is removed or damaged during the oxide removal stage. The phase of the anode metal oxide 12 formed during the oxide restoration stage can be the first phase of the anode metal oxide 12. Suitable methods for the oxide restoration stage can be the same or similar to the methods used in the aging phase.

An example oxide phase extraction includes one or more cycles. Each cycle can include the oxide removal stage followed by the oxide restoration phase. When the oxide phase extraction includes multiple cycles, the cycles can be repeated in series. An example oxide phase extraction includes a high temperature stage that acts as an oxide removal stage followed by a low temperature stage and a charging stage. The low temperature stage can be performed between the high temperature stage and the charging stage. The high temperature stage can be configured to move all or a portion of the second phase of the anode metal oxide 12 from the anode precursor 56 and into the electrolyte 40. The low temperature stage can be configured to form the first phase of the anode metal oxide 12 on any anode metal 14 that becomes exposed during the high temperature stage. The charging stage causes a current surge through the anode precursor 56 that reforms the anode metal oxide 12. For instance, the charging stage can form the first phase of the anode metal oxide 12 on the anode precursor 56 from oxygen in the electrolyte 40. Accordingly, the low temperature stage and the charging stage together can serve as an oxide restoration stage.

An example of a single cycle of the oxide phase extraction includes a high temperature stage where the capacitor precursor 61 is exposed to a temperature $T_1$ for a time period $P_1$; a low temperature stage where the capacitor precursor 61 is exposed to a temperature $T_2$ for a time period $P_2$; and a charging stage where the capacitor precursor 61 is charged to $V_1$ and discharged. The cycle of the oxide phase extraction can be performed 1-10 times. In some embodiments, the cycle of the oxide phase extraction can be performed more than 10 times.

Examples of suitable $T_1$ include, but are not limited to, $T_1$ greater than 45° C., or 50° C. and/or less than 90° C. or 100° C. In some instances, prolonged exposure of the capacitor to temperatures above 90° C. can damage one or more components of the capacitor. Examples of suitable $P_1$ include, but are not limited to, $P_1$ greater than 0.5 hours and/or less than 2 days. The variables $T_1$ and $P_1$ can be a function of materials and/or configuration. Additionally, the value of $P_1$ can be a function of $T_1$. Exposure of a capacitor precursor 61 to increased temperatures for prolonged periods of time can damage the capacitor precursor 61 components. As a result, as $T_1$ increases, it is generally desirable to reduce the value of $P_1$. For example, when $T_1$ is above 85° C., $P_1$ can be less than 2 hours but when $T_1$ is below 50° C., $P_1$ can be more than 1 day.

Examples of suitable $T_2$ include, but are not limited to, $T_2$ greater than 35° C., or 45° C. and/or less than 50° C. or 70° C. Examples of suitable $P_2$ include, but are not limited to, $P_2$ greater than 10 minutes and/or less than 100 minutes or one day. In some instances, $T_1$ is higher than $T_2$ but $P_1$ is longer than $P_2$. Examples of suitable $V_1$ include, but are not limited to, $V_1$ greater than 200 V or 400V and/or less than 500V or 600V. Examples of suitable N include, but are not limited to, N greater than 0, 1, or 8 and/or less than 15, 25, or 35.

An example of the oxide phase extraction includes any one, any two, any three, any four, any five, or any six features selected from the group consisting of $T_1$ greater than 45° C., or 50° C. and/or less than 90° C. or 100° C., $P_1$ greater than 0.5 hours and/or less than 2 days, $T_2$ greater than 35° C. or 45° C. and/or less than 50° C. or 70° C., $P_2$ greater than 10 minutes and/or less than 100 minutes or one day, $V_1$ greater than 200 V or 400V and/or less than 500V or 600V. In some instances, this oxide phase extraction is performed for a number of cycles, N, greater than 0, 1, or 8 and/or less than 15, 25, or 35.

When the anode metal 14 is aluminum and the first phase of the anode metal oxide 12 is the boehmite phase of aluminum oxide, an example of a cycle the oxide phase extraction includes a high temperature stage where the capacitor precursor 61 is placed in a 90° C. (+/−5° C.) oven for 1 hour (+/−5 min); a low temperature stage where the capacitor precursor 61 is placed in a 37° C. (+/−5° C.) oven for 30 minutes (+/−5 min); a charging stage where the capacitor precursor 61 is charged to 422.5 Volts and discharged. To execute the oxide phase extraction, this cycle of the oxide phase extraction can be performed once or sequentially repeated for 1 or more cycles to 35 or fewer cycles. The total number of cycles performed can be a function of the capacitor response to the preceding cycles. For instance, performance of additional cycles can be optional or skipped once the time needed to charge the capacitor after a cycle is less than a threshold. In one example, the threshold is 5% of the time needed to charge the capacitor before the cycle.

The exact number of cycles needed can be a function of the properties of the sheet of material 48 and the thermal effect of laser cutting on the edge. As a result, the number of cycles that are performed can be variable. For example, the time needed to charge the capacitor precursor 61 can be measured after each cycle. The measured charge time can be compared to a charge time threshold. If the charge time for cycle j exceeds the threshold, then an additional cycle can be performed. When the charge time for cycle j falls below the threshold, additional cycles are not performed. For instance, the threshold can be a percentage of the time needed to charge the capacitor after the immediately preceding cycle. In one example, the threshold is 5% of the time needed to charge the capacitor before the cycle.

Completion of the oxide extraction phase provides the anode and capacitor of FIG. 1A through FIG. 1G. Accordingly, the capacitor is ready for use in the desired application and/or for resale.

Example 1

A first anode precursor, second anode precursor, third anode precursor, and a fourth anode precursor were fabricated as described above. For instance, the anode precursors were formed using an aluminum foil as the anode metal. The surface area enhancement phase and oxide formation phase were performed on the aluminum foil so as to provide the sheet of material. The conditions of the surface area enhancement phase and the oxide formation phase were the same for the first anode precursor and the second anode precursor.

The first anode precursor was extracted from the sheet of material using a laser having a pulse duration of 820 femtoseconds, a pulse frequency of 400,000 pulses per second, and a power density on the face of the sheet of material of $8 \times 10^{11}$ W/cm$^2$. The laser beam was traced on the face of the sheet of material along a pathway having the shape desired for the perimeter of an anode precursor. The beam speed at the face of the sheet of material was 110 mm/s, a spot overlap was 99.50%, and six passes were required in order to completely separate the anode precursor from the sheet of material.

The second anode precursor was extracted from the sheet of material using a laser having a pulse duration of 820 femtoseconds, a pulse frequency of 400,000 pulses per second, and a power density on the face of the sheet of material of $1 \times 10^{12}$ W/cm². The laser beam was traced on the face of the sheet of material along a pathway having the shape desired for the perimeter of an anode precursor. The beam speed at the face of the sheet of material was 310 mm/s, a spot overlap was 98.60%, and twelve passes were required in order to completely separate the anode precursor from the sheet of material.

The third anode precursor was extracted from the sheet of material using a laser having a pulse duration of 820 femtoseconds, a pulse frequency of 400,000 pulses per second, and a power density on the face of the sheet of material of $1 \times 10^{12}$ W/cm². The laser beam was traced on the face of the sheet of material along a pathway having the shape desired for the perimeter of an anode precursor. The beam speed at the face of the sheet of material was 440 mm/s, a spot overlap was 98.0%, and 20 passes were required in order to completely separate the anode precursor from the sheet of material.

The fourth anode precursor was extracted from the sheet of material using a laser having a pulse duration of 820 femtoseconds, a pulse frequency of 400,000 pulses per second, and a power density on the face of the sheet of material of $8 \times 10^{11}$ W/cm². The laser beam was traced on the face of the sheet of material along a pathway having the shape desired for the perimeter of an anode precursor. The beam speed at the face of the sheet of material was 720 mm/s, a spot overlap was 96.7%, and sixty passes were required in order to completely separate the anode precursor from the sheet of material.

FIG. 3A is a Scanning Electron Microscope image of an edge of the first anode precursor. This image shows the presence of re-solidified material on the edge of the first anode precursor. FIG. 3B is a Scanning Electron Microscope image of an edge of the second anode precursor. This image shows the presence of re-deposited material on the edge of the second anode precursor. FIG. 3C is a Scanning Electron Microscope image of an edge of the third anode precursor. This image shows the absence of both re-solidified material and re-deposited material on the edge of the second anode precursor. FIG. 3D is a Scanning Electron Microscope image of an edge of the fourth anode precursor. This image shows the absence of both re-solidified material and re-deposited material on the edge of the second anode precursor.

Example 2

The method of anode fabrication described in the context of FIG. 2A through FIG. 2I was followed to fabricate a first capacitor, a second capacitor, and a third capacitor. The first capacitor, the second capacitor, and the third capacitor each included anodes formed using an aluminum foil as the anode metal. The surface area enhancement phase and oxide formation phase were performed on the aluminum foil so as to provide the sheet of material. The variables for the surface area enhancement phase and the oxide formation phase were the same or essentially for each of the capacitors.

The first capacitor was prepared using anodes constructed from anode precursors constructed according to the first anode precursors of Example 1. The second capacitor was prepared using anodes constructed from anode precursors constructed according to the second anode precursors of Example 1. The third capacitor was prepared using anodes constructed from anode precursors constructed according to the third anode precursors of Example 1.

Each capacitor was assembled with 45 anodes (~115 microns thick each) stacked with 10 aluminum foil cathodes (~12 microns thick each) and an ethylene glycol based electrolyte that included boric acid. Separators of 1.06 Density Kraft Paper at ~20 microns thickness were positioned between adjacent anodes and cathodes. An aging phase and a testing phase were performed on each of the capacitors. The conditions for the aging phase and testing phase were the same for each of the capacitors.

The capacitors were each run through a series of downs and tested for the level of deformation at each down. A down for a capacitor simulates the aging that a capacitor experiences when used in an Implantable Cardioverter Defibrillator (ICD) that is implanted in a patient for a 3 month period of time. A down can be simulated by exposing the capacitor to heat. For each of the downs, the capacitors were maintained at about 90° C. for about 16 hours. After every down or every other down, the capacitors were tested for deformation. Deformation is a measure of the change in the amount of time required to charge the capacitor relative to a baseline time. For instance, the deformation for down i can be measured as ((down i charge time)/(baseline charge time)−1)×100% where the baseline charge time is the time needed to charge the capacitor at time i=1. The charging source used for each deformation measurement was the same.

Figure 4A:
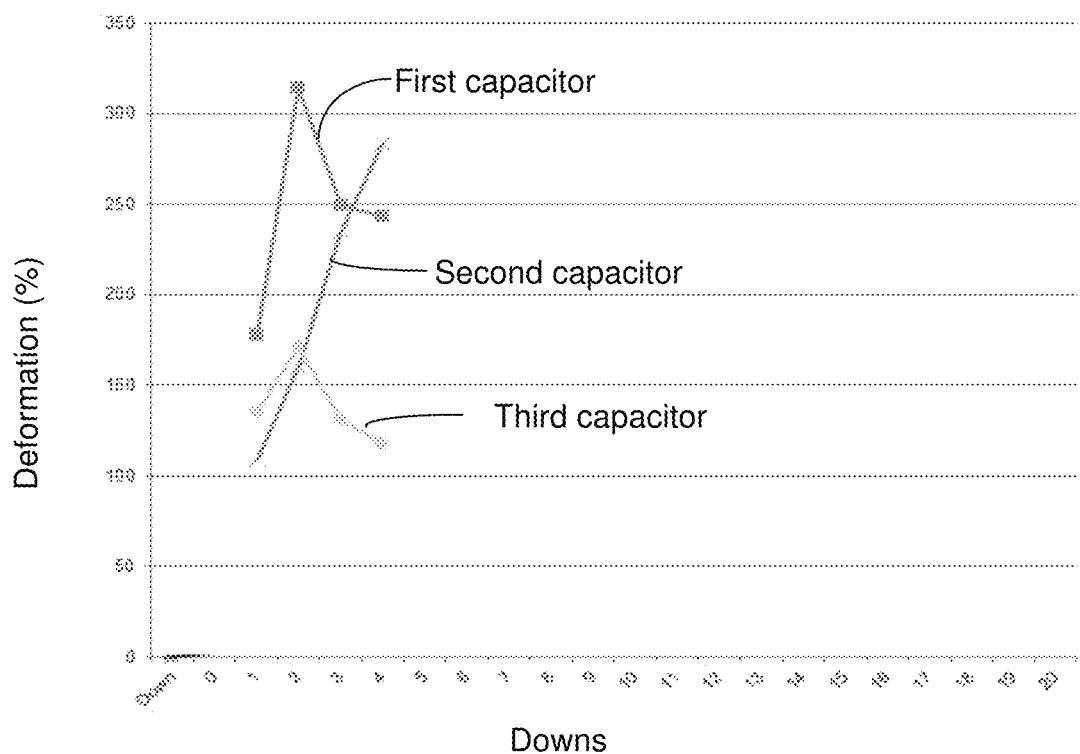
FIG. 4A is a plot of deformation versus downs for multiple different capacitors that do not experience an oxide phase extraction.

The results of the above measurements are presented in FIG. 4A. The results for the first capacitor are labeled "first capacitor" in FIG. 4A. The results for the second capacitor are labeled "second capacitor" in FIG. 4A. The results for the third capacitor are labeled "third capacitor" in FIG. 4A. The laser cutting parameters used to generate FIG. 4A did not bring the deformation below 100% without the use of an oxide phase extraction.

Example 3

The method of anode fabrication described in the context of FIG. 2A through FIG. 2I was followed to fabricate a first capacitor, a second capacitor, and a third capacitor. The first capacitor, the second capacitor, and the third capacitor each included anodes formed using an aluminum foil as the anode metal. The surface area enhancement phase and oxide formation phase were performed on the aluminum foil so as to provide the sheet of material. The variables for the surface area enhancement phase and the oxide formation phase were the same or essentially for each of the capacitors.

The anodes precursors for the first capacitor, second capacitor, and third capacitor were laser cut from the sheet of material using the same laser.

The anode precursors for the first capacitor were extracted from the sheet of material using a laser having a pulse duration of 820 femtoseconds, a pulse rate of 400,000 pulses per second, and a power density on the face of the sheet of material of $8 \times 10^{11}$ W/cm. The laser beam was traced on the face of the sheet of material along a pathway having the shape desired for the perimeter of an anode precursor. The beam speed at the face of the sheet of material was 110 mm/sec, the spot overlap was 99.50%, and 6 passes were required in order to completely separate the anode precursor from the sheet of material.

The anode precursors for the second capacitor were extracted from the sheet of material using a laser having a pulse duration of 820 femtoseconds, a pulse rate of 400,000 pulses per second, and a power density on the face of the sheet of material of $1 \times 10^{12}$ W/cm. The laser beam was traced on the face of the sheet of material along a pathway having the shape desired for the perimeter of an anode precursor. The beam speed at the face of the sheet of material was 310 mm/sec, the spot overlap was 98.6%, and 12 passes were required in order to completely separate the anode precursor from the sheet of material.

The anode precursors for the third capacitor were extracted from the sheet of material using a laser having a pulse duration of 820 femtoseconds, a pulse rate of 400,000 pulses per second, and a power density on the face of the sheet of material of $1 \times 10^{12}$ W/cm. The laser beam was traced on the face of the sheet of material along a pathway having the shape desired for the perimeter of an anode precursor. The beam speed at the face of the sheet of material was 440 mm/sec, the spot overlap was 98.0%, and 20 passes were required in order to completely separate the anode precursor from the sheet of material.

Each capacitor was assembled with 45 anodes (~115 microns thick each) stacked with 10 aluminum foil cathodes (~12 microns thick each) and an ethylene glycol based electrolyte that included boric acid. Separators of 1.06 Density Kraft Paper at ~20 microns thickness were positioned between adjacent anodes and cathodes. An aging phase and a testing phase were performed on each of the capacitors. The conditions for the aging phase and testing phase were the same for each of the capacitors.

The capacitors were each run through a series of downs and tested for the level of deformation at each down. For each of the downs, the capacitors were maintained at about 90° C. for about 16 hours. After every down or every other down, the capacitors were tested for deformation. Deformation is a measure of the change in the amount of time required charge the capacitor relative to a baseline time. For instance, the deformation for down i can be measured as ((down i charge time)/(baseline charge time)−1)×100% where the baseline charge time is the time needed to charge the capacitor at time i=1. The charging source used for each deformation measurement was the same.

Figure 4B:
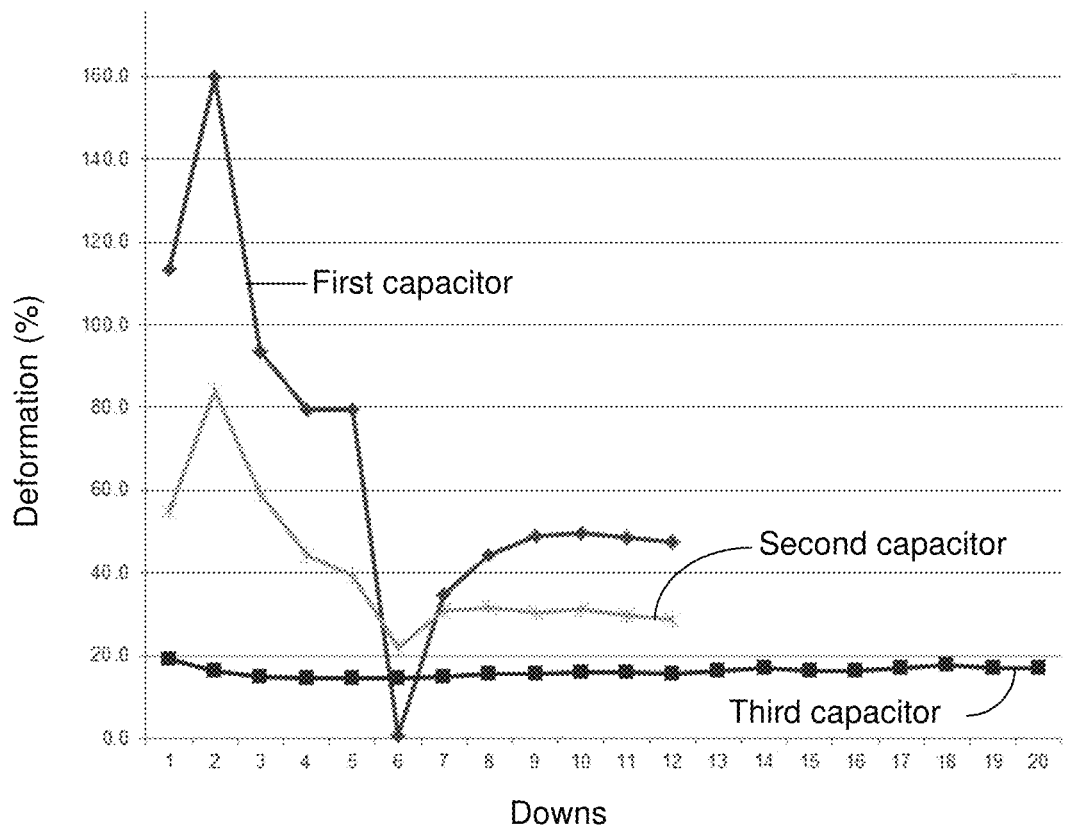
FIG. 4B is another plot of deformation versus downs for multiple different capacitors that do not experience an oxide phase extraction.

The results of the above measurements are presented in FIG. 4B. The results for the first capacitor are labeled "first capacitor" in FIG. 4B. The results for the second capacitor are labeled "first capacitor" in FIG. 4B. The results for the third capacitor are labeled "first capacitor" in FIG. 4B. FIG. 4B shows that adjusting laser cutting parameters can bring deformation below 20% without the use of an oxide phase extraction. In contrast, using stamping to cut anodes out of a similar sheet of material provides deformation levels above 25% at approximately down 10. This result shows that selection of laser cutting parameters can bring deformation levels at or below the level associated with stamping of the anodes.

Example 4

The method of anode fabrication described in the context of FIG. 2A through FIG. 2I was followed to fabricate a first capacitor and a second capacitor. For instance, the first capacitor and the second capacitor each included anodes formed using an aluminum foil as the sheet of material in performing the surface area enhancement phase, oxide formation phase, and laser cutting so as to remove the anodes from the resulting sheets of material. The first capacitor and the second capacitor were each assembled with 45 anodes (~115 microns thick each) stacked with 10 aluminum foil cathodes (~12 microns thick each) and an ethylene glycol based electrolyte that included boric acid. Separators of 1.06 Density Kraft Paper at ~20 microns thickness were positioned between adjacent anodes and cathodes.

An aging phase and a testing phase were performed on the first capacitor and the second capacitor. The conditions for the surface area enhancement phase, oxide formation phase, laser cutting, aging phase and testing phase were the same for the first capacitor and the second capacitor. The laser cutting was performed by a Trumpf TruMicro5050 fs edition laser having a pulse duration of 820 femtoseconds, a pulse rate of 400,000 pulses per second, and a power density on the face of the sheet of material of $8 \times 10^{11}$ W/cm. The laser beam was traced on the face of the sheet of material along a pathway having the shape desired for the perimeter of an anode precursor. The beam speed at the face of the sheet of material was 720 mm/sec, the spot overlap was 96.7%, and 60 passes were required in order to completely separate the anode precursor from the sheet of material. An oxide phase extraction was performed on the second capacitor but not on the first capacitor. The oxide phase extraction had a cycle that included a high temperature stage where the second capacitor was placed in a ~90° C. oven for about 1 hour; a low temperature stage where the second capacitor was placed in a ~37° C. oven for about 30 minutes; and a charging stage where the second capacitor was charged to ~422.5 Volts and discharged. The cycles of the oxide phase extraction were performed sequentially for 10 cycles.

Figure 5A:
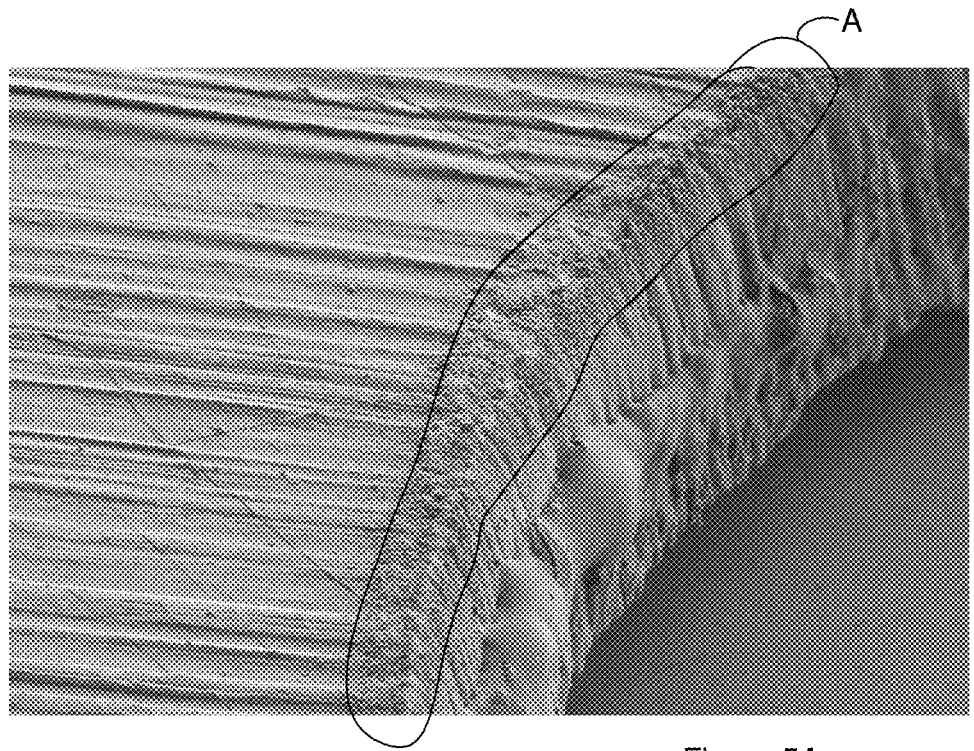
FIG. 5A is a Scanning Electron Microscope image of an edge of an anode from a capacitor that does not experience an oxide phase extraction phase.
Figure 5B:
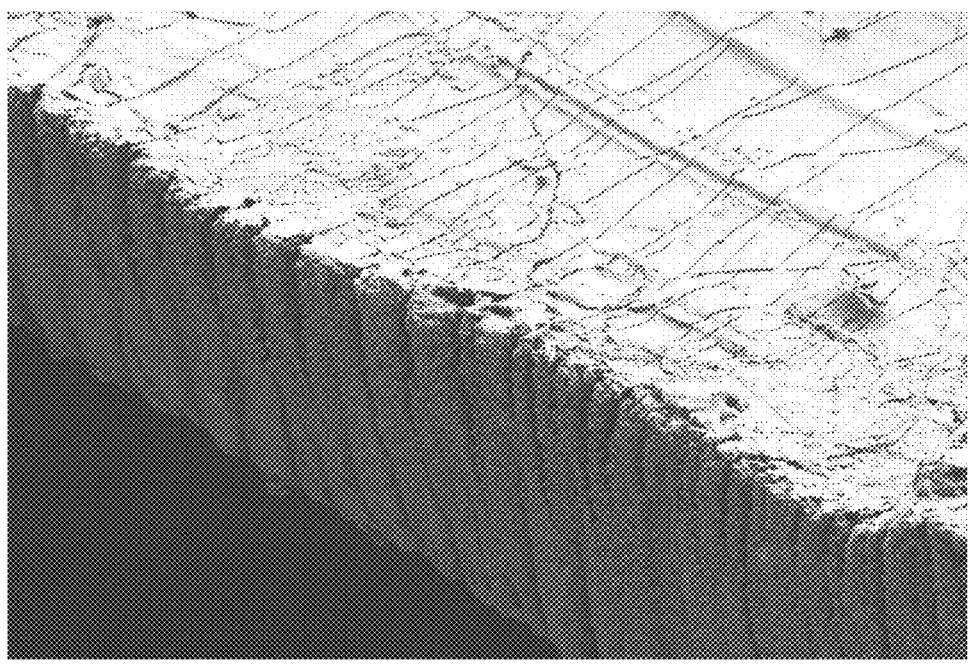
FIG. 5B is a Scanning Electron Microscope image of an edge of an anode from a capacitor that experiences an oxide phase extraction phase.

The first capacitor and the second capacitor were disassembled and the anodes examined. FIG. 5A is a Scanning Electron Microscope image of an edge of an anode from the first capacitor. The portion of the image within the line labeled A is believed to be alpha phase corundum oxide ($\alpha$-$Al_2O_3$) positioned on boehmite aluminum oxide. FIG. 5B is a Scanning Electron Microscope (SEM) image of an edge of an anode from the second capacitor. The alpha phase corundum oxide ($\alpha$-$Al_2O_3$) that is evident in FIG. 5A is not evident in FIG. 5B. The alpha phase corundum oxide is removed during the high temperature stage of the oxide phase extraction. In particular, the high temperature stage of the oxide phase extraction activates a reaction between a component of the electrolyte and the alpha phase corundum oxide ($\alpha$-$Al_2O_3$). For instance, without being bound to theory, it is believed that the high temperature stage causes a hydration reaction between the alpha phase corundum oxide ($\alpha$-$Al_2O_3$) and water in the electrolyte and that the reaction product moves off the surface of the anode and into the electrolyte.

Example 5

The method of anode fabrication described in the context of FIG. 2A through FIG. 2I was followed to fabricate a first capacitor, a second capacitor, a third capacitor and a fourth capacitor. The first capacitor, the second capacitor, the third capacitor, and the fourth capacitor each included anodes formed using an aluminum foil as the sheet of material in performing the surface area enhancement phase, oxide formation phase. The variables for the surface area enhancement phase and the oxide formation phase were the same or essentially the same for each of the capacitors.

The anodes in the first capacitor were extracted from the sheet of material 48 using die cutting rather than laser cutting. The anodes in the second capacitor, third capacitor and fourth capacitor were laser cut from the sheet of material using the same 820 femtosecond laser. The cutting conditions for the anodes in the second capacitor were different from the cutting conditions for the anodes in the third capacitor. For the second capacitor, the laser was set at a pulse rate of 400,000 pulses per second, and a power density on the face of the sheet of material of $1 \times 10^{12}$ W/cm. The laser beam was traced on the face of the sheet of material along a pathway having the shape desired for the perimeter of an anode precursor. The beam speed at the face of the sheet of material was 440 mm/sec, the spot overlap was 98.6% and 20 passes. For the third capacitor, the laser was set at a pulse rate of 400,000 pulses per second, and a power density on the face of the sheet of material of $8 \times 10^{11}$ W/cm. The laser beam was traced on the face of the sheet of material along a pathway having the shape desired for the perimeter of an anode precursor. The beam speed at the face of the sheet of material was 720 mm/sec, the spot overlap was 96.7%, and 60 passes. The anodes of the fourth capacitor were cut under the same laser conditions as the anodes of the third capacitor.

Each capacitor was assembled with 45 anodes (~115 microns thick each) stacked with 10 aluminum foil cathodes (~12 microns thick each) and an ethylene glycol based electrolyte that included boric acid. Separators of 1.06 Density Kraft Paper at ~20 microns thickness were positioned between adjacent anodes and cathodes. The conditions for the aging phase and testing phase were the same for each of the capacitors. An oxide phase extraction was performed on the fourth capacitor but not on the first capacitor, the second capacitor, or the third capacitor. The oxide phase extraction had a cycle that included a high temperature stage where the second capacitor was placed in a ~90° C. oven for about 1 hour; a low temperature stage where the second capacitor was placed in a ~37° C. oven for about 30 minutes; and a charging stage where the second capacitor was charged to ~422.5 Volts and discharged. The oxide phase extraction was performed for 10 sequential cycles.

The capacitors were each run through a series of downs and tested for the level of deformation at each down. A down for a capacitor simulates the aging that a capacitor experiences when used in an Implantable Cardioverter Defibrillator (ICD) that is implanted in a patient for a 3 month period of time. A down can be simulated by exposing the capacitor to heat. For each of the downs, the capacitors were maintained at about 90° C. for about 16 hours. After every other down, the capacitors were tested for deformation. Deformation is a measure of the change in the amount of time required to charge the capacitor relative to a baseline time. For instance, the deformation for down i can be measured as ((down i charge time)/(baseline charge time)−1)×100% where the baseline charge time is the time needed to charge the capacitor at time i=1. The charging source used for each deformation measurement was the same.

Figure 6:
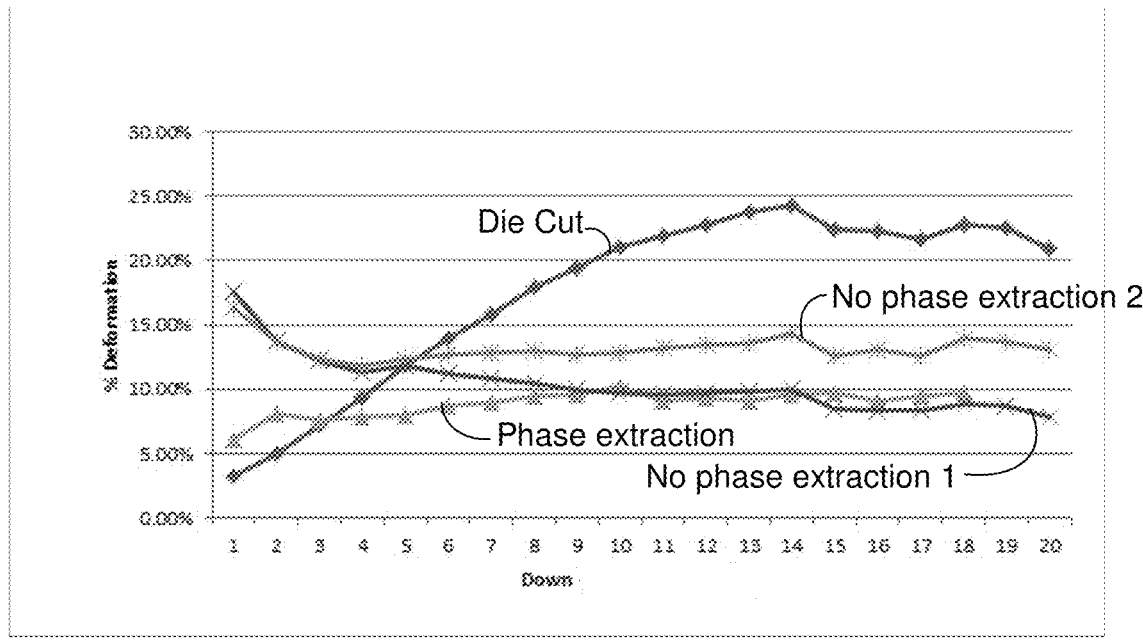
FIG. 6 is a plot of deformation versus downs for multiple different capacitors.

The results of the above measurements are presented in FIG. 6. The results for the first capacitor are labeled "die cut" in FIG. 6. The results for the second capacitor are labeled "no phase extraction 1" in FIG. 6. The results for the third capacitor are labeled "no phase extraction 2" in FIG. 6. The results for the fourth capacitor are labeled "phase extraction" in FIG. 6.

The results in FIG. 6 show a positive slope for the first capacitor. This positive slope is believed to be caused by incorporation of iron from the die in the unformed edges of the anodes during aging. The second capacitor and the third capacitor provide curves that start at elevated higher levels of deformation and then drop down to a flatter and more consistent slope. This result is believed to occur because the use of laser cutting to cut the anodes reduces the presence of the iron at the edges of the anodes. The fourth capacitor starts at significantly lower levels of deformation than either the second capacitor or the third capacitor and then stays at these reduced levels for subsequent downs. The ability of the fourth capacitor to start and stay at reduced deformation levels means that less energy is required to charge the capacitor over the life of the capacitor.

Example 6

Figure 7:
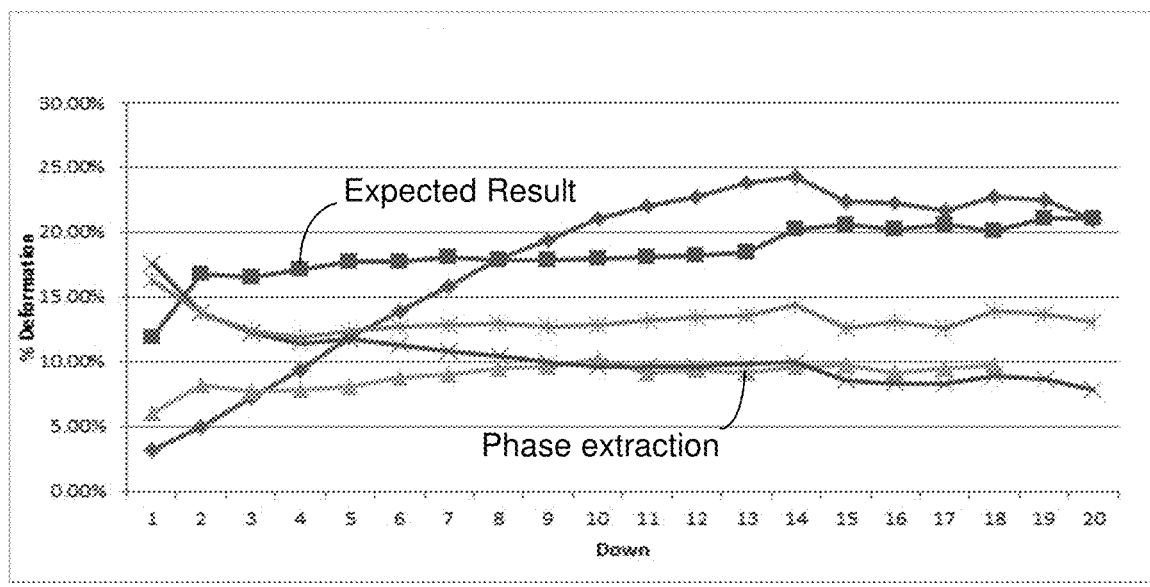
FIG. 7 is another plot of deformation versus downs for multiple different capacitors.

The results achieved in Example 2 were unexpected. History has shown that putting energy into the capacitor before the first down can cause a drop in the level deformation shown at the first down. However, this drop in deformation has proven to be temporary and the deformation rises toward it original value in subsequent downs. As an example, FIG. 7 adds a curve labeled "expected result" to FIG. 6. Rather than performing an oxide phase extraction, the capacitor was put through 52 cycles where the capacitor was repeatedly charged and discharged. As expected, this curve shows that the level of deformation increases after the initial drop in deformation. In contrast, the curve labeled "phase extraction" does not show a temporary drop in the level of deformation. The unexpected retention of the reduced deformation levels is believed to be the result of the alpha phase corundum oxide ($\alpha$-$Al_2O_3$) moving into the electrolyte.

Example 7

Figure 8A:
FIG. 8A is a picture of a sheet of material before a thermal compression.
Figure 8B:
FIG. 8B shows the sheet of material of FIG. 8A after thermal compression.

A sheet of material was generated as disclosed in the context of FIG. 2A through FIG. 2E. The sheet of material was warped as shown in FIG. 8A. A thermal treatment was performed on the sheet of material. The thermal treatment included a low pressure compression followed by a high pressure compression. The low pressure compression and the high pressure compression were performed using plates as compression members. The compression members were located in an oven in order to keep the compression surfaces as the desired compression temperature. The low pressure compression was performed for a compression time of 5 seconds, a compression temperature of 500° C., at a compression pressure of 0.1 psi. The high pressure compression was performed for a compression time of 10 seconds, a compression temperature of 500° C., at a compression pressure of 1 psi. The results of the thermal treatment are shown in FIG. 8B.

Example 8

First capacitors included first anodes that were generated without thermal compression. The first anodes were cut from a sheet of material generated as disclosed in the context of FIG. 2A through FIG. 2E. A series of four anode oxide formation operations were performed on a sheet of material. A thermal treatment was performed after each of the anode oxide formation operations. The thermal treatments were each performed by placing the sheet of material in an oven at 500° C. for four minutes.

Second capacitors included second anodes that were generated with thermal compression. The second anodes were cut from a sheet of material generated under conditions similar to the sheet of material used in the first capacitors. A series of four anode oxide formation operations were performed on a sheet of material under conditions similar to the conditions of the anode oxide formation operations used to generate the anodes. A thermal treatment was performed after each of the anode oxide formation operations. The thermal treatment performed after the second anode oxide formation operation included thermal compression. In contrast, the thermal treatment performed after the first, third and fourth anode oxide formation operations did not included thermal compression. In particular, the thermal treatments performed after the first, third and fourth anode oxide formation operations were performed by placing the sheet of material in an oven at 500° C. for 4 minutes. The thermal treatment performed after the second anode oxide formation operation included a single compression operation. The compression operation was performed using plates as compression members. The compression members were located in an oven in order to keep the compression surfaces as the desired compression temperature. The compression operation was performed for a compression time of 1 minute, at a compression temperature of 400° C., at a compression pressure of 0.1 psi.

Figure 9A:
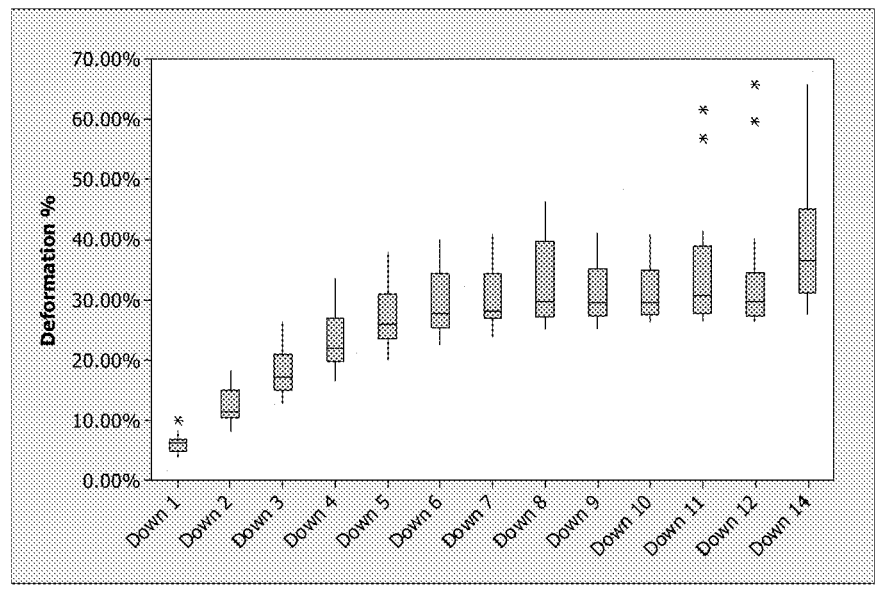
FIG. 9A is a plot of deformation versus downs for capacitors that were each generated without thermal compression.
Figure 9B:
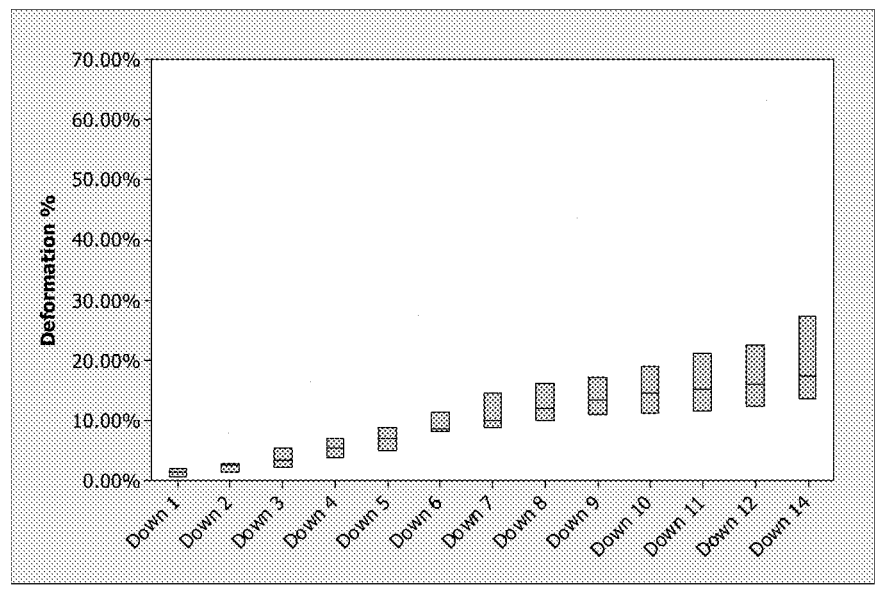
FIG. 9B is a plot of deformation versus downs for capacitors that were each generated with a singled thermal compression.

The capacitors were each run through a series of downs and tested for the level of deformation at each down as described above in Example 2. The results for the first capacitors are presented in FIG. 9A. The results for the first capacitors are presented in FIG. 9B. Despite using only one thermal compression at a low compression temperature, the second capacitors show improved deformation performance. The improvement in deformation can lead to increased longevity of a device such as an Implantable Cardioverter Defibrillator (ICD) device by improving the capM time interval from 4-6 months to 9-12 months. Additionally, the second capacitors show reduced variability in deformation. The inventors believe that the second capacitors would show even lower levels of deformation at higher compression temperatures, such as 500° C.

Additionally, the second capacitors showed a 5.5% higher foil capacitance than the first capacitors. The leakage current for the second capacitors increased from 144.8 µA to 261.0 µA. However, leakage is not as important of a performance indicator in applications where a potential is only occasionally applied to the capacitors such as in ICDs. Further, the inventors believe that leakage of the second capacitors can be reduced by using higher compression temperatures, such as 500° C.

Figure 10:
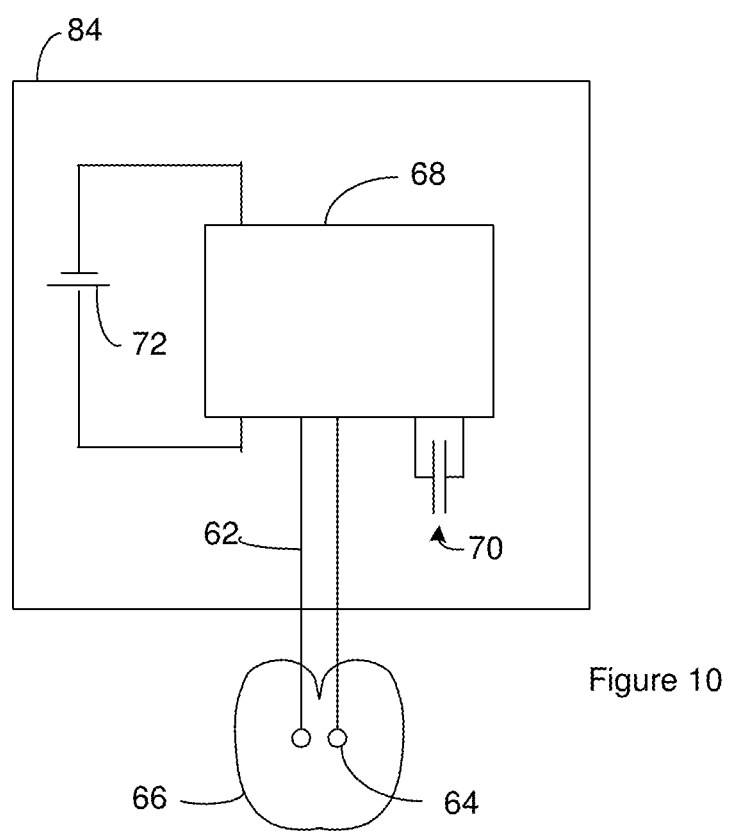
FIG. 10 is a schematic diagram of a defibrillation system that includes an Implantable Cardioverter Defibrillator (ICD) that employs one or more capacitors.

The above capacitors can be used in medical devices such as an Implantable Cardioverter Defibrillator (ICD). FIG. 10 is a schematic diagram of a defibrillation system that includes an Implantable Cardioverter Defibrillator (ICD) that employs one or more capacitors constructed as disclosed above. The defibrillation system includes lead lines 62 connected to electrodes 64 in contact with the heart. Although the defibrillation system is shown with two electrodes 64, the defibrillation system may include three or more electrodes 64 and/or three or more lead lines. The specific positions of the electrodes 64 relative to the heart 66 is dependent upon the requirements of the patient.

The defibrillation system also includes a processing unit 68. The lead lines 62 provide electrical communication between the processing unit 68 and the electrodes 64. The processing unit 68 is also in electrical communication with one or more capacitors constructed as disclosed above.

The processing unit 68 receives power from a battery 72. The processing unit 68 can place the battery 72 in electrical communication with the one or more capacitors 70. For instance, the processing unit 68 can cause the battery 72 to charge the one or more capacitors 70. Additionally, the processing unit 68 can place the one or more capacitors 70 in electrical communication with the lead lines 62. For instance, the processing unit 68 can cause the one or more capacitors to be discharged such that electrical energy stored in the one or more capacitors is delivered to the heart through all or a portion of the electrodes 64. The processing unit 68, the battery 72 and the one or more capacitors 70 are positioned in a case 84.

During operation of the defibrillation system, the defibrillation system employs output from the lead lines 62 to monitor the heart and diagnose when defibrillation shocks should be provided. When the processing unit 68 identifies that defibrillation shocks are needed, the processing unit 68 provides the heart with one or more defibrillation shocks. To provide a defibrillation shock, the processing unit 68 employs energy from the battery 72 to charge the one or more capacitors 70. Once the one or more capacitors are charged, the processing unit 68 causes these capacitors to be discharged such that energy stored in the capacitors is delivered to the heart through all or a portion of the electrodes 64 in the form of defibrillation shocks. During the defibrillation shocks, the defibrillator requires that one or more pulses be delivered from the battery 72 to the one or more capacitors. Each pulse is generally associated with a defibrillation shock. The duration of each pulse is generally about 8 to 12 seconds with the pulses separated by a delay time that is based on how fast the battery charges the capacitor and determining the appropriate point to provide the defibrillation shock.

Suitable processing units 68 can include, but are not limited to, analog electrical circuits, digital electrical circuits, processors, microprocessors, digital signal processors (DSPs), computers, microcomputers, or combinations suitable for performing the monitoring and control functions. In some instances, the processing unit 68 has access to a memory that includes instructions to be executed by the processing unit 68 during performance of the control and monitoring functions.

The sequence of events disclosed above for forming an anode can be performed in a sequence other than the disclosed sequence. For instance, the oxide phase extraction can be performed on the anode before the capacitor is assembled. As another example, the aging phase can be performed after the testing phase.

Although the above methods of forming an anode have been disclosed in the context of a capacitor, the above oxide phase extraction can also be applied to the fabrication of anodes, cathodes, positive electrodes, and/or negative electrodes in batteries.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method fabricating a capacitor, comprising:
  laser cutting an anode from a sheet of a material, the laser cutting being performed with pulsed laser beam having pulse durations of less than a microsecond;
  a power density of the laser beam on the sheet of the material during the laser cutting being greater than $2 \times 10^5$ W/cm$^2$ and less than $2 \times 10^{12}$ W/cm$^2$, the laser cutting converting the material from a first phase to a second phase, and the power density of the laser beam vaporizing the material so as to reduce a level of a re-deposition of the second phase on the sheet of the material; and fabricating the capacitor that includes the anode.

2. The method of claim 1, wherein a pulse frequency is greater than 0 Hz and less than 2000 kHz.

3. The method of claim 1, wherein the sheet of the material includes an anode metal, and the power density of the laser beam is selected such that a temperature of the sheet of the material during the laser cutting is raised above a boiling point of the anode metal in less than 1 pulse.

4. The method of claim 3, wherein the anode metal is aluminum.

5. The method of claim 1, wherein during the laser cutting the laser beam is scanned across the sheet of the material at a scan rate greater than 100 mm/sec.

6. The method of claim 1, wherein a spot overlap during the laser cutting is greater than 70%.

7. The method of claim 1, wherein the laser cutting includes scanning the laser beam along a pathway for multiple passes and more than 10 passes are required to cut through the sheet of the material such that the anode can be removed from the sheet of the material.

8. The method of claim 1, wherein the laser cutting includes scanning the laser beam along a pathway for multiple passes and the pathway includes multiple different tracks that partially overlap one another, each track being a portion of the pathway that is followed by the laser beam during one of the passes.

9. A method fabricating a capacitor, comprising:

laser cutting an anode from a sheet of a material that includes an anode metal, the laser cutting being performed with a laser beam having a power density that can increase a temperature of a portion of the sheet of the material from room temperature to a temperature above a boiling point of the anode metal in less than a microsecond, wherein the power density of the laser beam at the sheet of the material is greater than $2\times10^5$ W/cm$^2$ the laser cutting converting the material from a first phase to a second phase, and the power density of the laser beam vaporizing the material so as to reduce a level of a re-deposition of the second phase on the sheet of the material; and fabricating the capacitor that includes the anode.

10. The method of claim 9, wherein the laser beam is pulsed and a duration of each pulse is less than a microsecond.

11. The method of claim 9, wherein the laser beam is pulsed and has the power density selected such that the temperature of the sheet of the material increases above the boiling point of the anode metal in one pulse.

12. The method of claim 9, wherein during the laser cutting the laser beam is scanned across the sheet of the material at a scan rate greater than 100 mm/sec.

13. The method of claim 9, wherein the laser cutting includes scanning the laser beam along a pathway for multiple passes and each location along the pathway is not exposed to energy of the laser beam for a pass interval that is greater than 0.1 s.

14. The method of claim 9, wherein the laser cutting includes scanning the laser beam along a pathway for multiple passes and more than 10 passes are required to cut through the sheet of the material such that the anode can be removed from the sheet of the material.

15. A method fabricating a capacitor, comprising:

laser cutting an anode from a sheet of a material that includes an anode metal, the laser cutting includes scanning a laser beam along a pathway for multiple passes and more than 10 passes are required to cut through the sheet of the material such that the anode can be removed from the sheet of the material, a power density of the laser beam at the sheet of the material is greater than $2\times10^5$ W/cm$^2$, the laser cutting converting the material from a first phase to a second phase, and the power density of the laser beam vaporizing the material so as to reduce a level of a re-deposition of the second phase on the sheet of the material; and fabricating the capacitor that includes the anode.

16. The method of claim 15, wherein each location along the pathway is not exposed to energy of the laser beam for a pass interval that is greater than 0.1 s.

17. The method of claim 15, wherein during the laser cutting the laser beam is scanned across the sheet of the material at a scan rate greater than 100 mm/sec and the power density of the laser beam on the sheet of the material during the laser cutting is greater than $4\times10^7$ W/cm$^2$ and less than $2\times10^{12}$ W/cm$^2$.

18. The method of claim 8, wherein one of the tracks overlaps another one of the tracks by greater than 25% and less than 75%.

19. The method of claim 1, wherein a spot size of the laser beam at the sheet of the material has a diameter or major axis greater than 10 microns.

* * * * *